United States Patent [19]
Isaacson et al.

[11] Patent Number: 6,065,116
[45] Date of Patent: May 16, 2000

[54] METHOD AND APPARATUS FOR CONFIGURING A DISTRIBUTED APPLICATION PROGRAM

[75] Inventors: Teri J. Isaacson, Plymouth; Gary L. Lien, Brooklyn Park; Barry F. Ruzek, Shoreview, all of Minn.

[73] Assignee: Unisys Corporation, Blue Bell, Pa.

[21] Appl. No.: 08/852,661

[22] Filed: May 7, 1997

[51] Int. Cl.⁷ .................................................. G06F 9/44
[52] U.S. Cl. .................................. 713/1; 713/100
[58] Field of Search ................... 713/1, 100; 709/220, 709/221, 222

[56] References Cited

U.S. PATENT DOCUMENTS

| | | | |
|---|---|---|---|
| 5,339,435 | 8/1994 | Lubkin et al. | 395/712 |
| 5,341,478 | 8/1994 | Travis, Jr. et al. | 709/203 |
| 5,381,534 | 1/1995 | Shi | 709/203 |
| 5,574,918 | 11/1996 | Hurley et al. | 712/220 |
| 5,581,670 | 12/1996 | Bier et al. | 395/326 |
| 5,581,684 | 12/1996 | Dudzik et al. | 395/338 |
| 5,581,686 | 12/1996 | Koppolu et al. | 395/340 |
| 5,584,035 | 12/1996 | Duggan et al. | 395/800 |

OTHER PUBLICATIONS

Microsoft Word for Windows 95, Version 7.0, Copyright 1983–1995 Microsoft Corporation.

Micron Help, Version, 1.1G, Copyright 1996, Micron Electronics, Inc.

Microsoft Windows 95, Copyright 1981–1995, Microsoft Corporation.

*Primary Examiner*—Dennis M. Butler
*Attorney, Agent, or Firm*—Charles A. Johnson; Mark T. Starr; Nawrocki, Rooney & Silvertson, P.A.

[57] ABSTRACT

Method and apparatus for automatically configuring a number of application programs that are resident on a number of computer platforms so that each of the application programs can communicate with the others via the interconnection therebetween.

26 Claims, 33 Drawing Sheets

METHOD AND APPARATUS FOR CONFIGURING A DISTRIBUTED APPLICATION PROGRAM

CROSS REFERENCE TO CO-PENDING APPLICATIONS

The present application is related to U.S. patent application Ser. No. 08/852,509, filed May 7, 1997, now U.S. Pat. No. 5,917,485 entitled "Operator Assistance for Heterogenous Data Processing Systems", and U.S. patent application Ser. No. 08/852,507, filed May 7, 1997, entitled "Operator Assistance for Data Processing Systems", both of which are assigned to the assignee of the present invention and which are all incorporated herein by reference.

BACKGROUND OF THE INVENTION

1. Field of the Invention

The present invention relates generally to data processing systems, and more particularly to such systems having heterogeneous resources.

2. Description of the Prior Art

The interconnection of various computer system to form a larger distributed data processing system has enjoyed increased popularity in recent years. One example of such a system is the interconnection of personal computers via Local Area Networks (LAN). Another example is the interconnection of personal computers to a larger server computer, such as for the internet.

A more specific example is the interconnection of personal computers to a mainframe type computer system. In this example, the personal computers may access, control and/or submit execution runs to the mainframe computer system. In this configuration, some computational tasks may be performed by the personal computer, while more complex tasks may be submitted to the mainframe computer system.

In any of the distributed data processing systems discussed above, a variety of application programs may be resident on the various computer platforms. For example, one application program may be resident on a personal computer, while a second application program may be resident on a mainframe computer system. In this example, the personal computer may execute the first application program locally, and may remotely access, control and/or submit execution runs to the second application program.

Rather than providing separate applications on each computer platform, a distributed application program may be provided. A distributed application program typically has a number of components, or portions, wherein each of the portions are resident on a different computer platform. For example, a distributed transaction processing system may be used to process a transaction, such as an airline reservation. The transaction may be initiated by a travel agent signed onto a personal computer. A reservation software product may have a first portion that is resident on the personal computer and a second portion that is resident on the mainframe. The portion that is resident on the personal computer may provide a user interface for accepting information from the travel agent. After accepting the information, the user information may be assembled, and a request may be provided to the mainframe computer system. The portion of the reservation product that is resident on the mainframe may receive the request from the personal computer, and may provide a transaction manager to coordinate the request.

Setting up application programs on multiple computer platforms is often a time consuming, tedious, and error prone task. Address and communication protocols must typically be configured. In addition, there are often a number of configuration type files which need to be updated or created to allow the different application programs to communicate with one another. These and other configuration tasks typically required a relatively large amount of technical knowledge, including the detailed file format procedures and architectures of the various computer platforms. This is even more difficult when heterogeneous computer platforms having different hardware and software architectures are used.

SUMMARY OF THE INVENTION

The present invention overcomes many of the disadvantages associated with the prior art by providing a method and apparatus for automatically configuring a number of application programs that are resident on a number of computer platforms so that each of the application programs can communicate with the others via the interconnection therebetween.

In a first embodiment of the present invention, a configuration program is provided. The configuration program solicits user configuration information from a user through a user interface, and further retrieves relevant application files containing application specific configuration requirements from each of the computer platforms. The configuration program then determines the appropriate configuration settings for each of the application programs. The configuration program then writes the derived configuration settings to the appropriate computer platforms so that each of the application programs can read the corresponding configuration settings. Once the application programs read the corresponding configuration settings, each application program may be properly configured and may communicate with the other application programs via the interconnection therebetween.

In a first embodiment, a user interface is provided for receiving user configuration information. An application program interface is also provided to solicit and receive application program configuration requirements from each of the application programs. This is preferably accomplished by receiving one or more configuration files that are associated with each of the application programs. This may include determining login requirements for each one of the plurality of computer platforms, and retrieving the configuration requirements for each of the application programs from the corresponding computer platform.

Once the user information and the application program specific configuration requirements are assembled, a configuration means may determine the appropriate configuration settings for each of the application programs. The configuration means then transfers appropriate configuration settings to each of the computer platforms so that each of the application programs can read the corresponding configuration settings. Once the application programs read the corresponding configuration settings, each application program may be properly configured and may communicate with the other application programs via the interconnection therebetween.

It is contemplated that the present invention may automatically configure both separate programs running on different computer platforms, and multiple components of a program, such as distributed application program portions, which are running on different computer platforms.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
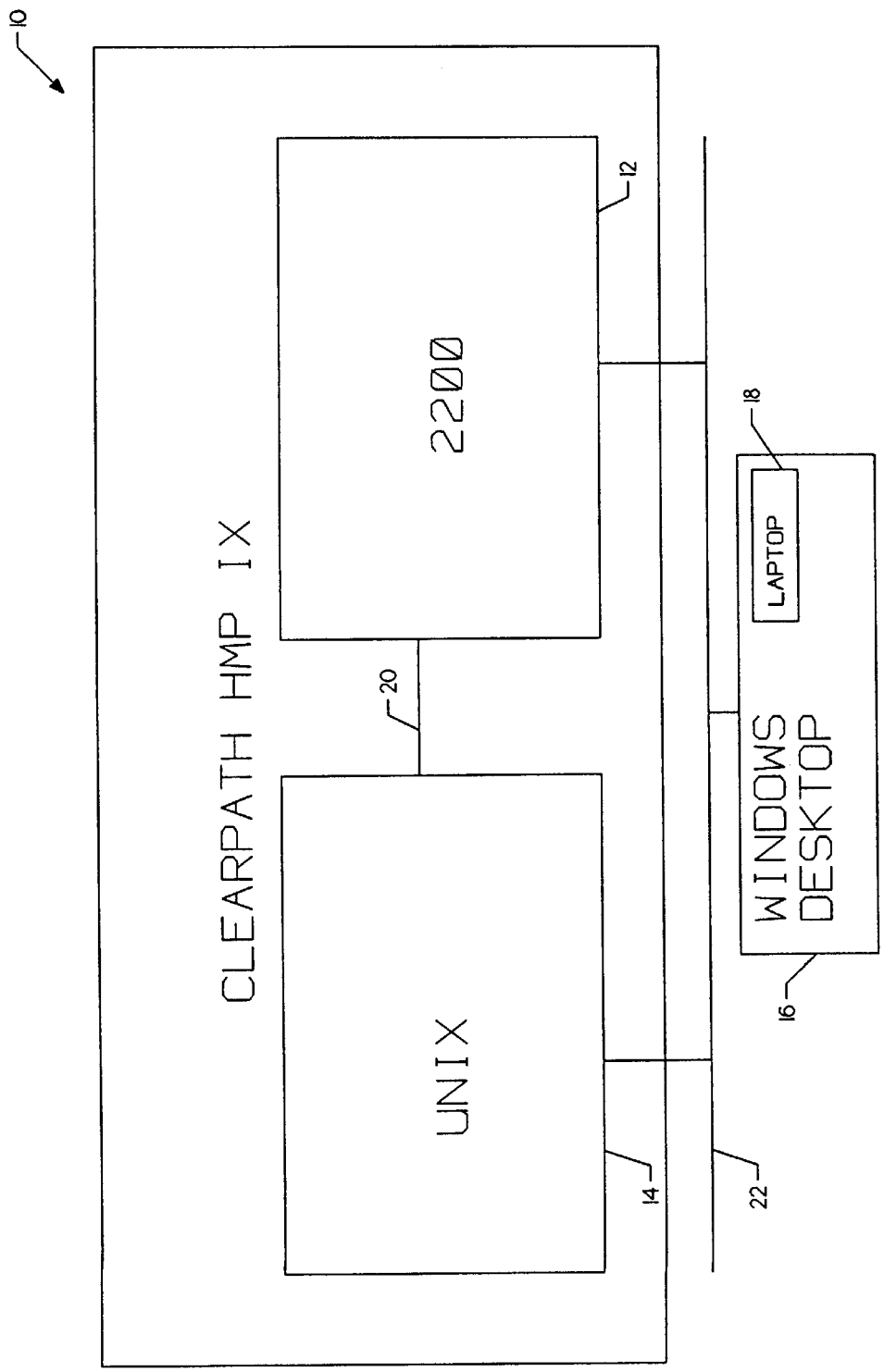
FIG. 1 is a block diagram of the hardware configuration of a first embodiment.

FIG. 1 is a block diagram showing the basic hardware components of the first embodiment of the present invention. CLEARPATH HMP IX system 10, 2200 platform 12 and UNIX platform 14 are commercially available from Unisys Corporation. Industry compatible desktop computer 16 and laptop computer 18 provide a WINDOWS 95 interface to the remainder of the system. 2200 platform 12 is coupled to UNIX platform 14 via internal local area network (LAN) 20. 2200 platform 12 and UNIX platform 14 are coupled to desktop computer 16 and laptop computer 18 via external LAN 22. These hardware and software elements, along with supporting documentation, are herein incorporated by reference.

Figure 2:
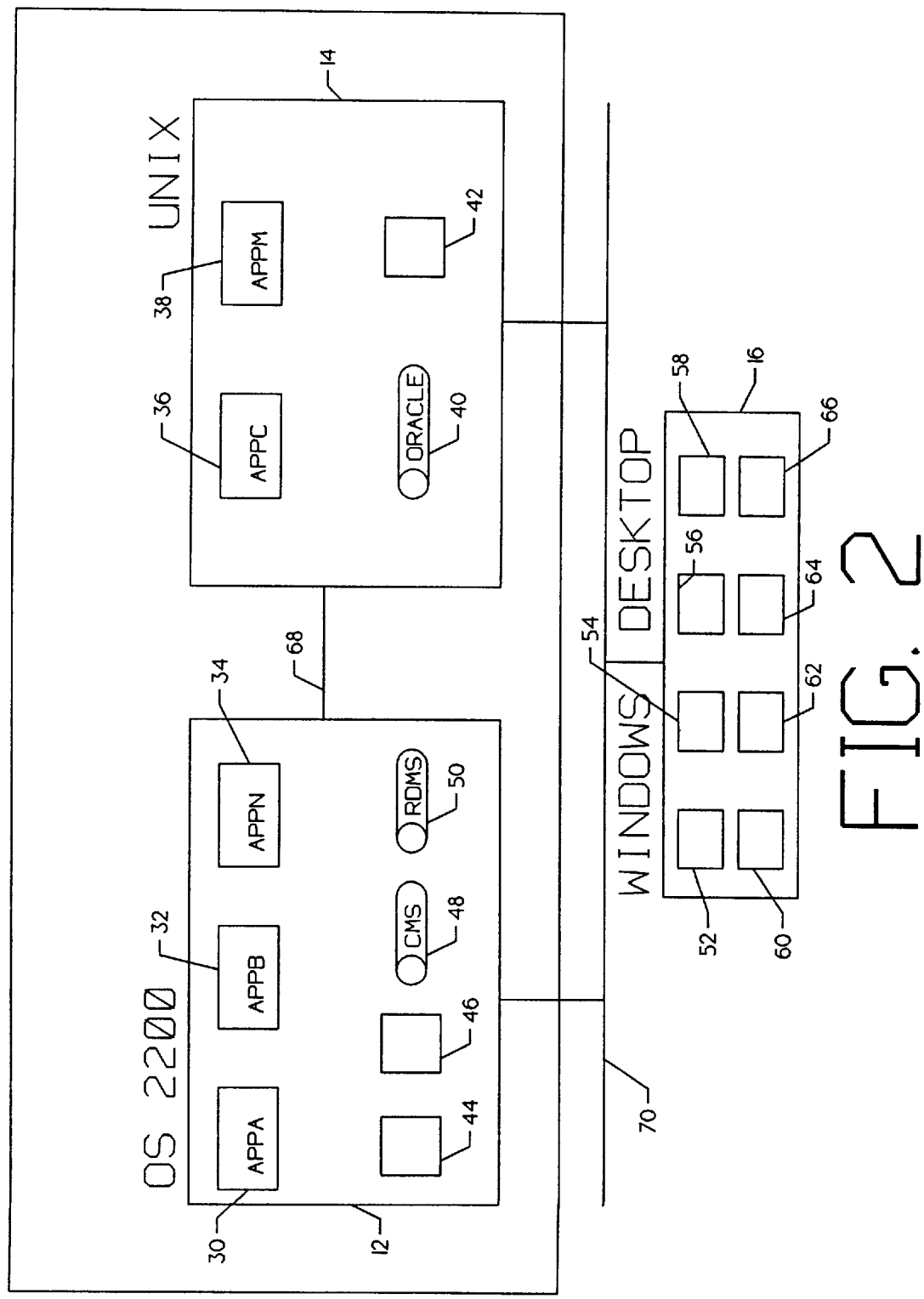
FIG. 2 is a block diagram of the software configuration of a first embodiment.

FIG. 2 is a schematic view of the various software elements of the first embodiment showing access by the user of the WINDOWS 95 based industry compatible platform to the large scale mainframe system elements. The function represented by icons 52, 54, 56, 58, 60, 62, 64 and 66 permit the user to directly call upon the mainframe functions using the CLEARPATH HMP IX system.

Under OS2200 control are application 30, application 32, and application 34, along with the database management and communication capabilities of OS2200 CMS 48 and RDMS 50. Also available and shown schematically are the OS2200 file handling functions 44 and report generation functions 46.

Likewise, UNIX controls application 36, application 38, oracle database manager 40, and the UNIX file management functions 42. OS2200 platform 12 is coupled to UNIX platform 14 via internal LAN 68. OS2200 platform 12 and UNIX platform 14 couple to desktop computer 16 via external LAN 70. The user at the industry compatible computer platform has direct access to all of these functions utilizing commercially available diverse system elements, which are herein incorporated by reference along with corresponding supporting documentation.

Application 30, application 32, application 34, application 36 and application 38 may be autonomous application programs. Application 30, application 32, application 34, application 36 and application 38 may also be one or more distributed application programs wherein each distributed application program includes a number of distributed application program components or portions, where each of the distributed application program portions corresponds to one or more of application 30, application 32, application 34, application 36 and application 38. Application 30, application 32, application 34, application 36 and application 38 may also be a combination of autonomous application programs and distributed application programs.

Application 30, application 32, application 34, OS2200 file handling function 44, report generation functions 46 and the database management and communication functions of OS2200 CMS 48 and RDMS 50, may be automatically configured to communicate with other application programs such as application 36, application 38, oracle database manager 40 and UNIX file management functions 42 resident on the UNIX platform. Thus, any application or utility under OS2200 control may be automatically configured to communicate with any application or utility under UNIX control. Furthermore, any application or utility from either the OS2200 or the UNIX platform may be configured to communicate with any application, utility or function resident on a third heterogeneous computer platform, such as the windows desktop 16.

Figure 3A:
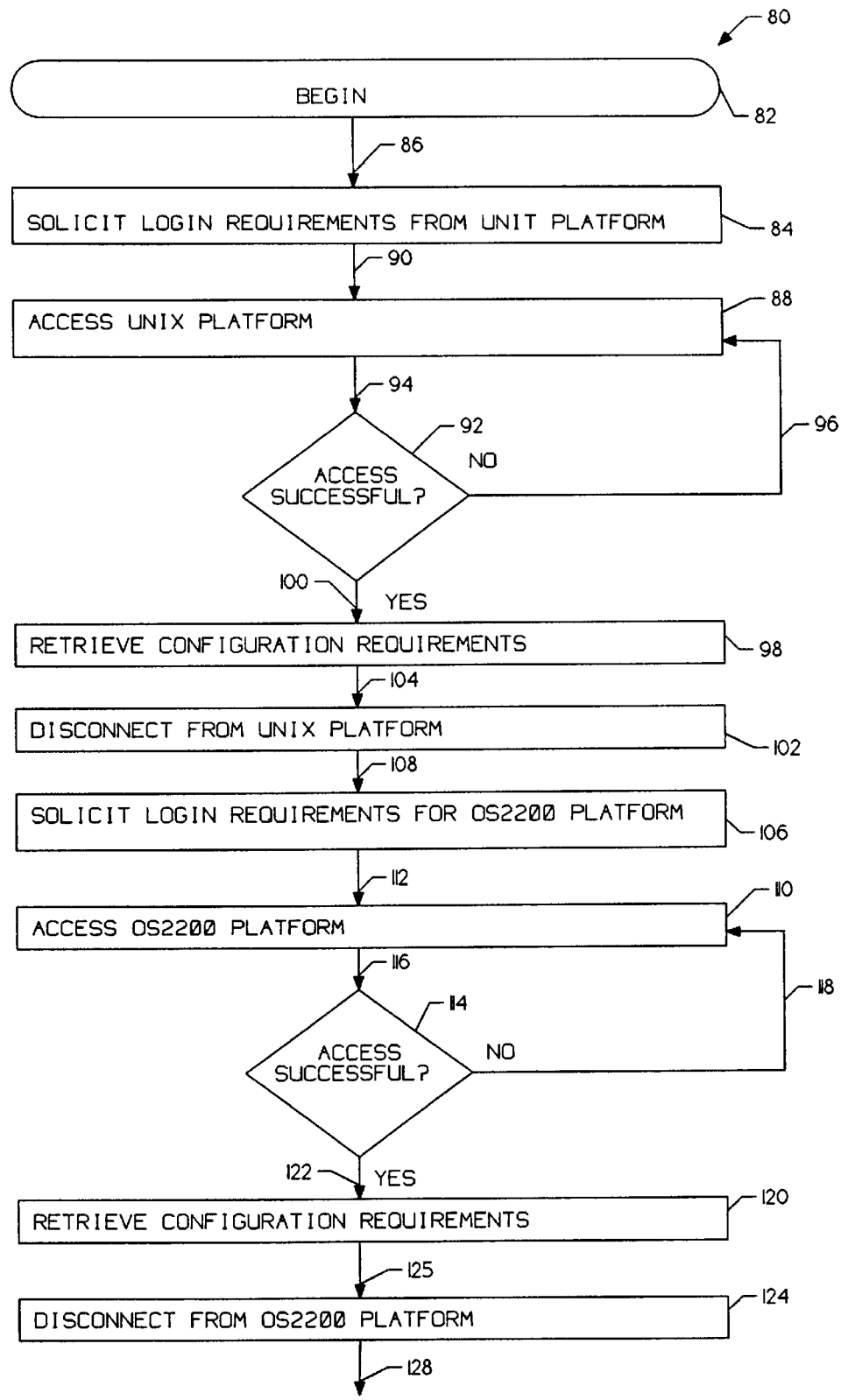
FIGS. 3A and 3B are a flow diagram showing a first method of the present invention.
Figure 3B:
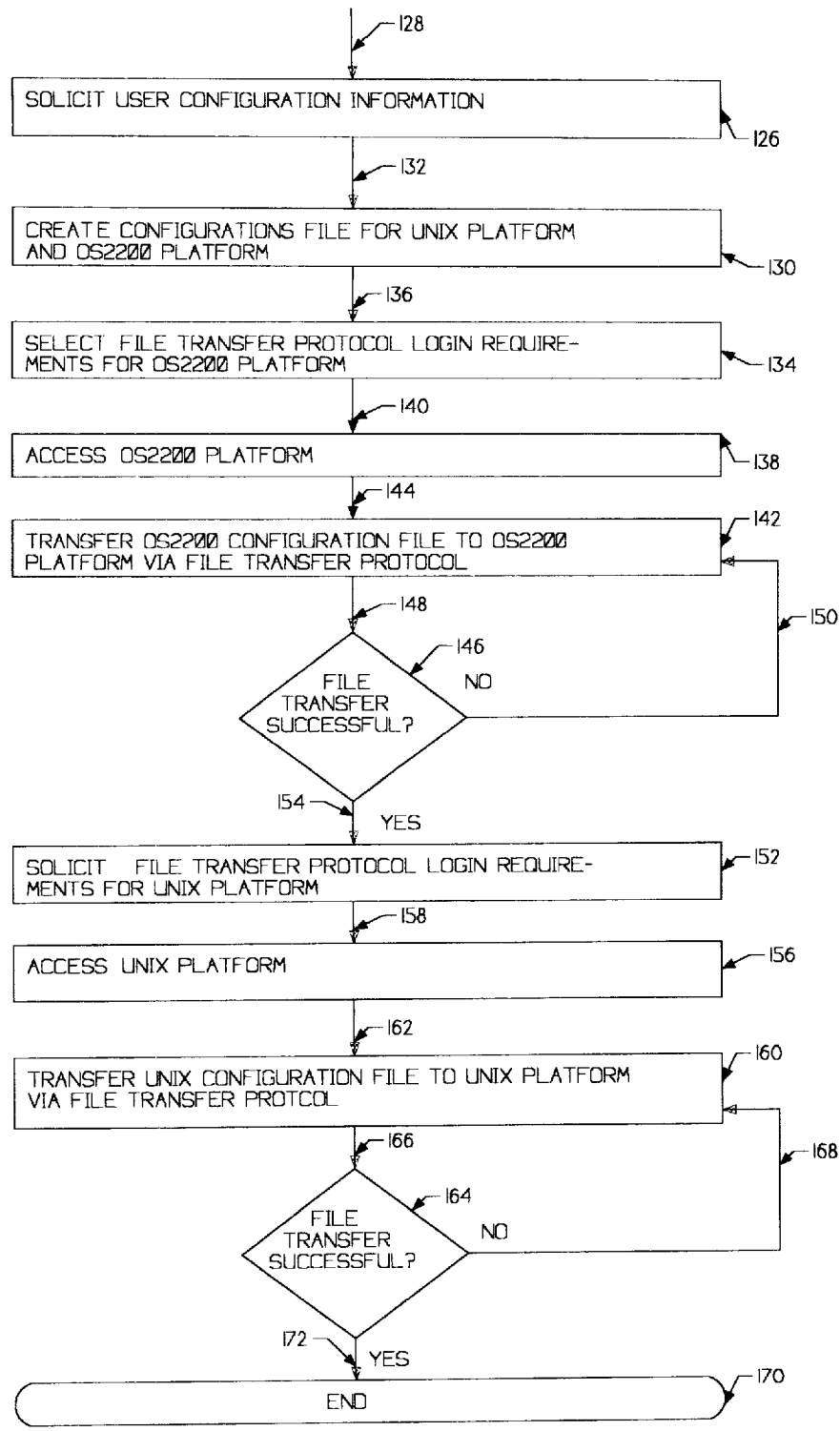

FIGS. 3A and 3B are a flow diagram showing a preferred method of the present invention. The diagram is generally shown at 80. The flow diagram is entered at element 82, wherein control is passed to element 84 via interface 86. Element 84 solicits login requirements from UNIX platform 14. These login requirements may include a UNIX host name, a user ID, and a password. Control is then passed to element 88 via interface 90. Element 88 accesses the UNIX platform 14 by creating a TELNET object and opening a TELNET session. TELNET is a standard network interface protocol. Control is then passed to element 92 via interface 94. Element 92 is a decisional element inquiring whether access to UNIX platform 14 was successful. If access was not successful, control is passed back to element 88 via interface 96. If access was successful, control is passed to element 98 via interface 100.

Element 98 retrieves configuration requirements. Several UNIX commands are issued to the host to obtain information about the UNIX host. The configuration requirements may include a host name, a user and group identifier, and internet protocol (IP) server addresses. The IP address is the network location identifier used by the internet protocol. An IP address consists of four numbers separated by periods, wherein each number is less than 256. Control is then passed to element 102 via interface 104. Element 102 disconnects from UNIX platform 14 by logging out of the TELNET session. Control is then passed to element 106 via interface 108.

Element 106 solicits login requirements for the OS2200 platform 12. The login requirements may include a 2200 host name, a user ID, a password, a run identifier for the OS2200, an account number and a project ID for the OS2200. Control is then passed to element 110 via interface 112. Element 110 accesses OS2200 platform 12 via CP2200 TELNET. Control is then passed to decisional element 114 via interface 116. Decisional element 114 determines if the access to OS2200 platform 12 was successful, and if not, passes control back to element 110 via interface 118. If access was successful, decisional element 114 passes control to element 120 via interface 122.

Element 120 retrieves configuration requirements. These configuration requirements include a DMS RLF number which identifies a database management system resident on the OS2200. The configuration requirements also includes the names of unused files. Control is then passed to element 124 via interface 125. Element 124 disconnects from OS2200 platform 12 by logging out of the TELNET session. Control is then passed to element 126 via interface 128.

Element 126 solicits user configuration information. The user is solicited for information such as whether OLTP recovery data should be logged to a single file (simplex) or to primary and backup files (duplex). The user is also solicited for an application qualifier, which is a number used to distinguish between transaction managers if two transaction managers are running on the OS2200 and UNIX servers. The user also provides permission levels for the UNIX system. Control is then passed to element 130 via interface 132.

Within method 80, elements 82 through 126 retrieve information, whereas, elements 130 through 170 create configuration files and transfer the files to the UNIX platform 14 and OS2200 platform 12. Once the configuration settings are built, each configuration is stored in a separate file on the platform on which method 80 is being executed (e.g., desktop computer 16). Control is then -passed to element 134 via interface 136.

Element 134 selects file transfer protocol login requirements for OS2200 platform 12. The file transfer protocol (FTP) is used to copy each configuration file to its proper location in the OS2200 platform 12 and UNIX platform 14. FTP login information for the open programming environment (OPE) is solicited. OPE is a Unisys implementation of the UNIX environment which operates on top of the OS2200 operating environment. The FTP login information may include the name or IP address of OPE, a user ID and/or a password. Control is then passed to element 138 via interface 140.

Element 138 accesses OS2200 platform 12. Control is then passed to element 142 via interface 144. Element 142 transfers the OS2200 configuration file to OS2200 platform 12 via FTP. Control is then passed to decisional element 146 via interface 148. Decisional element 146 transfers control back to element 142 via interface 150 if the file transfer was not successful. Decisional element 146 passes control to element 152 via interface 154 if the file transfer was successful.

Element 152 solicits FTP login requirements for UNIX platform 14. Control is then passed to element 156 via interface 158. Element 156 accesses UNIX platform 14. Control is then passed to element 160 via interface 162. Element 160 transfers the UNIX configuration file to UNIX platform 14 via FTP. Control is then passed to decisional element 164 via interface 166 where control is passed back to element 160 via interface 168 if the file transfer was not successful. Control is passed to element 170 via interface 172 if the file transfer was successful, wherein the method is exited.

Figure 4:
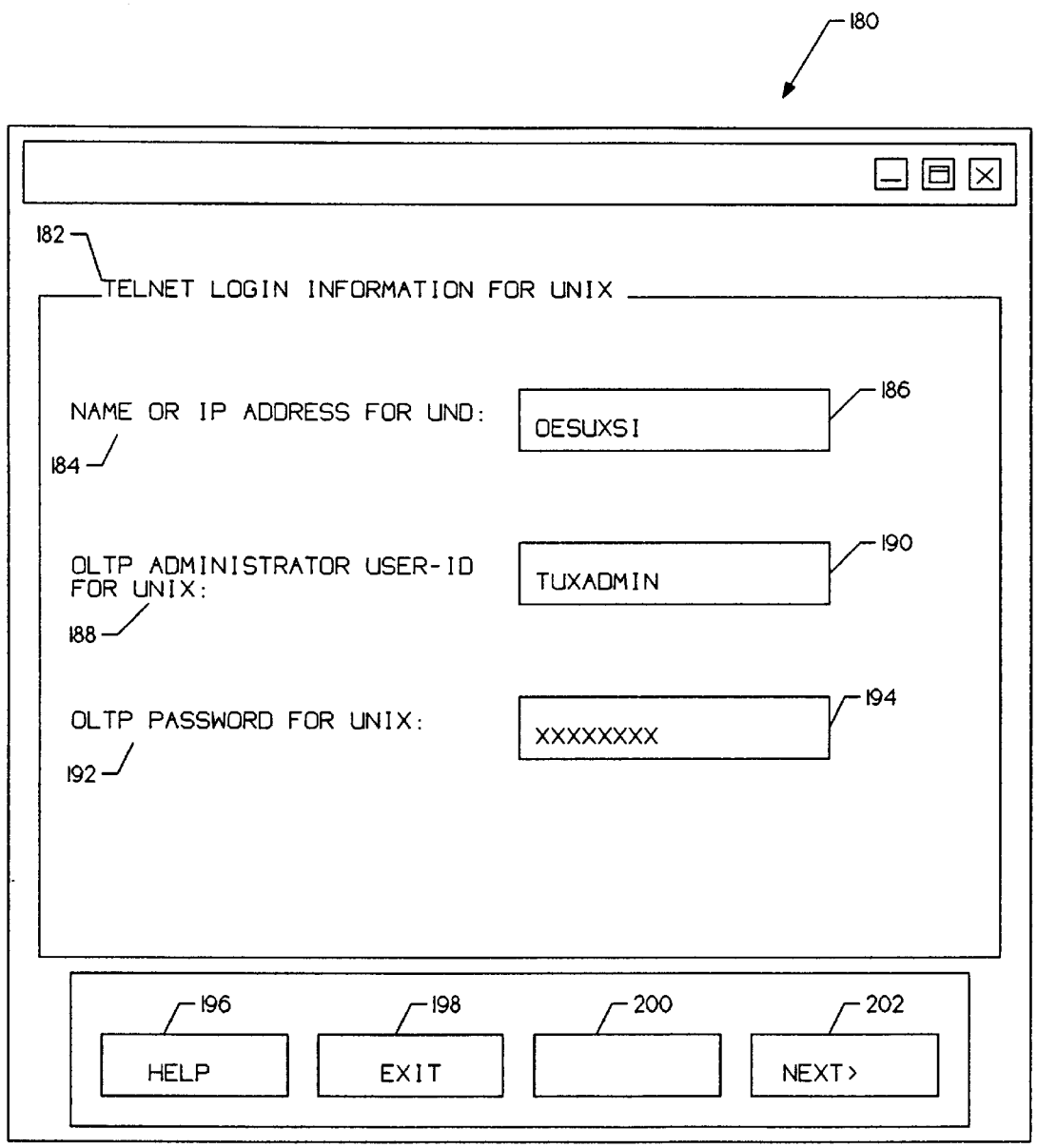
FIG. 4 is a view of a screen of PATHMATE of the first embodiment requesting TELNET login information for the UNIX platform.

FIGS. 4–14 describe the interface to the configuration utility via the PATHMATE help system for the preferred method shown in FIGS. 3A and 3B. FIG. 4 shows the PATHMATE menu window 180 from which the user selects TELNET login information for the UNIX platform. Window 180 provides the user response to element 84 of FIG. 3. The request of window 180 is shown at 182, which indicates TELNET login information for the UNIX platform. At 184, the first request is for a name or IP address for the UNIX platform. The response may be entered by a user at 186. The response shown at 186 or any response discussed within the context of the first and second embodiments are not deemed to be limiting or reduce the scope of the invention in anyway, but are merely representative.

The user may enter the response at 186 which is here shown as "oesuxsi". The second request within window 180 is for the OLTP administrator user ID for the UNIX platform and is shown at 188. The representative response shown at 190 is "tuxadmin". The third request by window 180 is for the OLTP password for UNIX shown at 192, where the response is entered at 194.

In addition to providing the field for receiving user provided text, four selection buttons are shown at the bottom window 180. Help button 196 provides the user with background and formatting information or any information being solicited. Exit button 198 allows the user to cancel the current product configuration. Back button 200 allows the user to return to the previous screen to reenter information. Next button 202 allows the user to proceed to the next screen.

Figure 5:
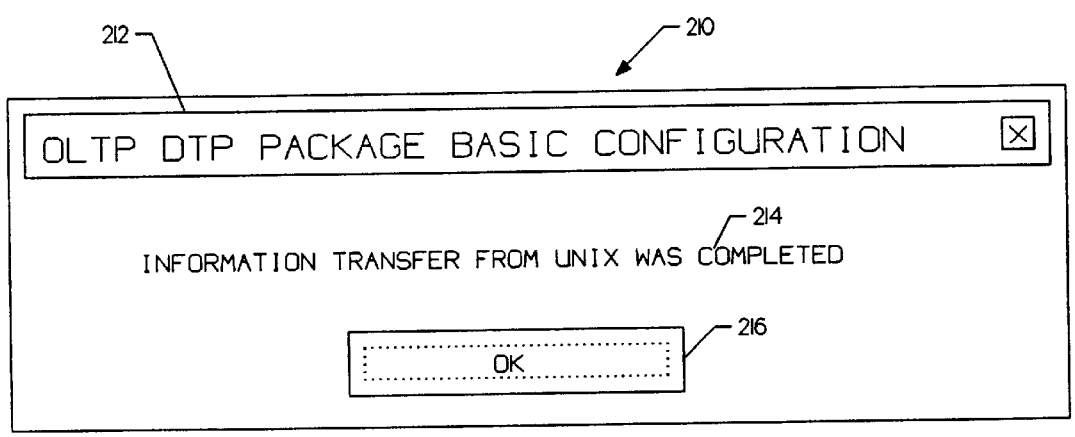
FIG. 5 is a view of a screen of the first embodiment requesting acknowledgement that the transfer of information from the UNIX platform was completed.

FIG. 5 is a view of a screen of the first embodiment indicating acknowledgment that the transfer of information from UNIX platform 14 was completed. Window 210 indicates OLTP DTP package basic configuration at 212 and queries whether the information transferred from the UNIX platform was completed at 214. The user affirms the message of window 210 by clicking the icon at 216. Window 210 occurs after element 98 is executed in FIG. 3, where the user indicates at 216 the complete transfer of information from the UNIX platform 14 before execution is transferred to element 102 which disconnects from the UNIX platform 14.

Figure 6:
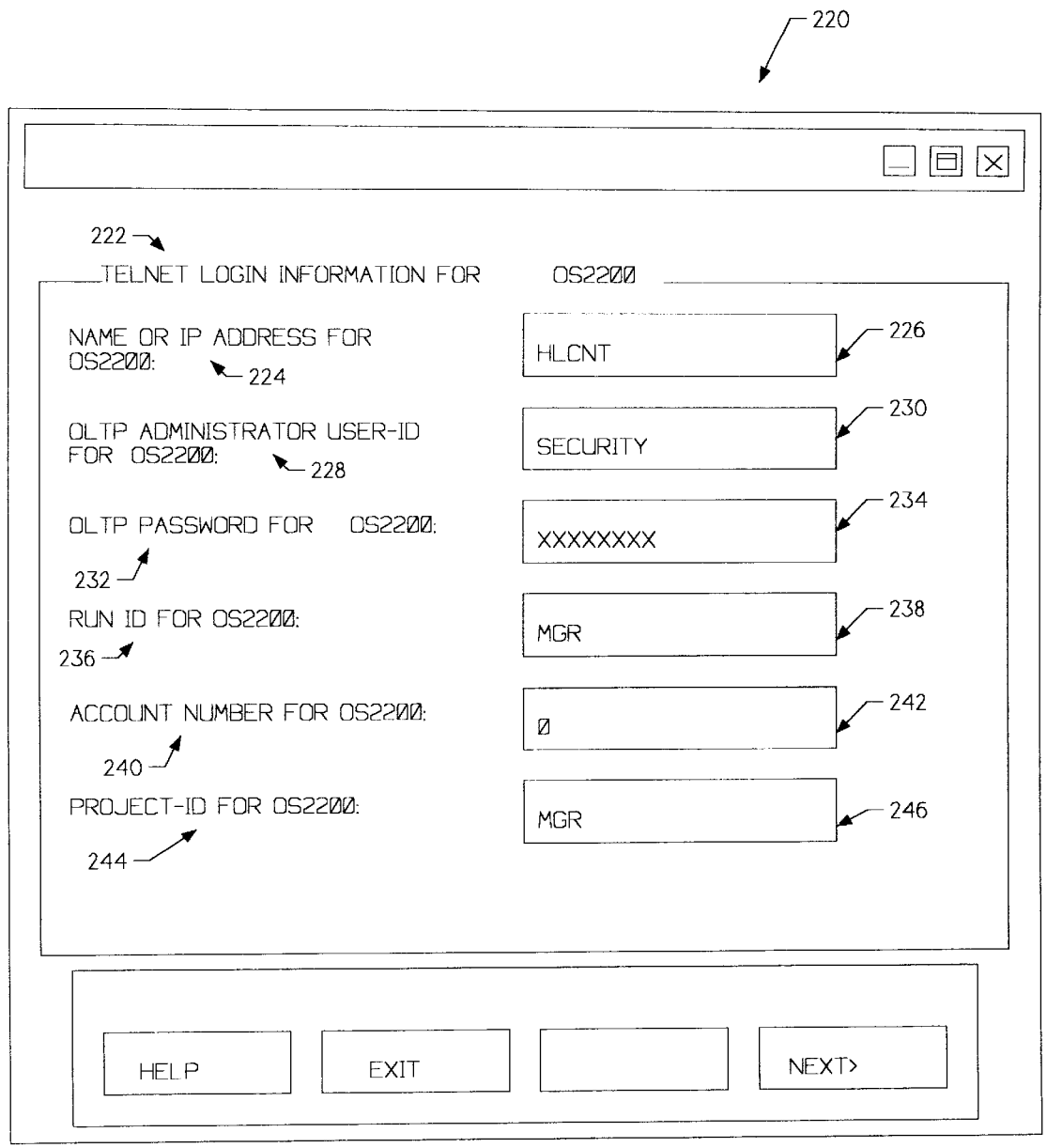
FIG. 6 is a view of a screen of the first embodiment requesting TELNET login information for the OS2200 platform.

FIG. 6 is a view of a screen of the first embodiment requesting TELNET login information for OS2200 platform 12. Window 220 corresponds with element 106 shown in FIG. 3. Window 220 provides the user response to element 106. Window 220 indicates at 222 that TELNET login information for OS2200 is being requested. The name or IP address for OS2200 is requested at 224 and the user response is entered at 226. The OLTP administrator user ID for OS2200 is requested at 238, and the user response is entered at 230. The OLTP password for OS2200 is requested at 232, and the user response is input at 234. The run ID for the OS2200 is requested at 236 and the user response is entered at 238. The account number of OS2200 is requested at 240, and the user response is entered at 242. The project ID for OS2200 is requested at 244, and the user response is entered at 246.

Figure 7:
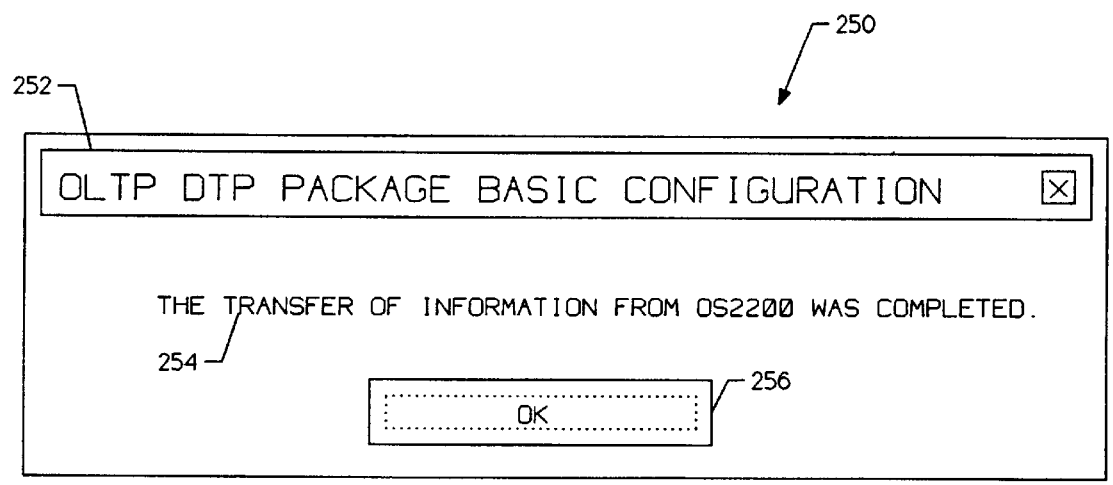
FIG. 7 is a view of a screen of the first embodiment requesting acknowledgement that the transfer of information from the OS2200 platform was completed.

FIG. 7 is a view of a screen of the first embodiment indicating acknowledgement that the transfer of information from the OS2200 platform 12 was completed. Window 250 indicates the OLTP DTP package basic configuration at 252. The user affirms the message of window 250 by clicking the icon at 256. Window 250 corresponds to element 120 in FIG. 3, where the user indicates at 256 the complete transfer of information from the OS2200 before execution is transferred to element 124 which disconnects from OS2200 platform 12.

Figure 8:
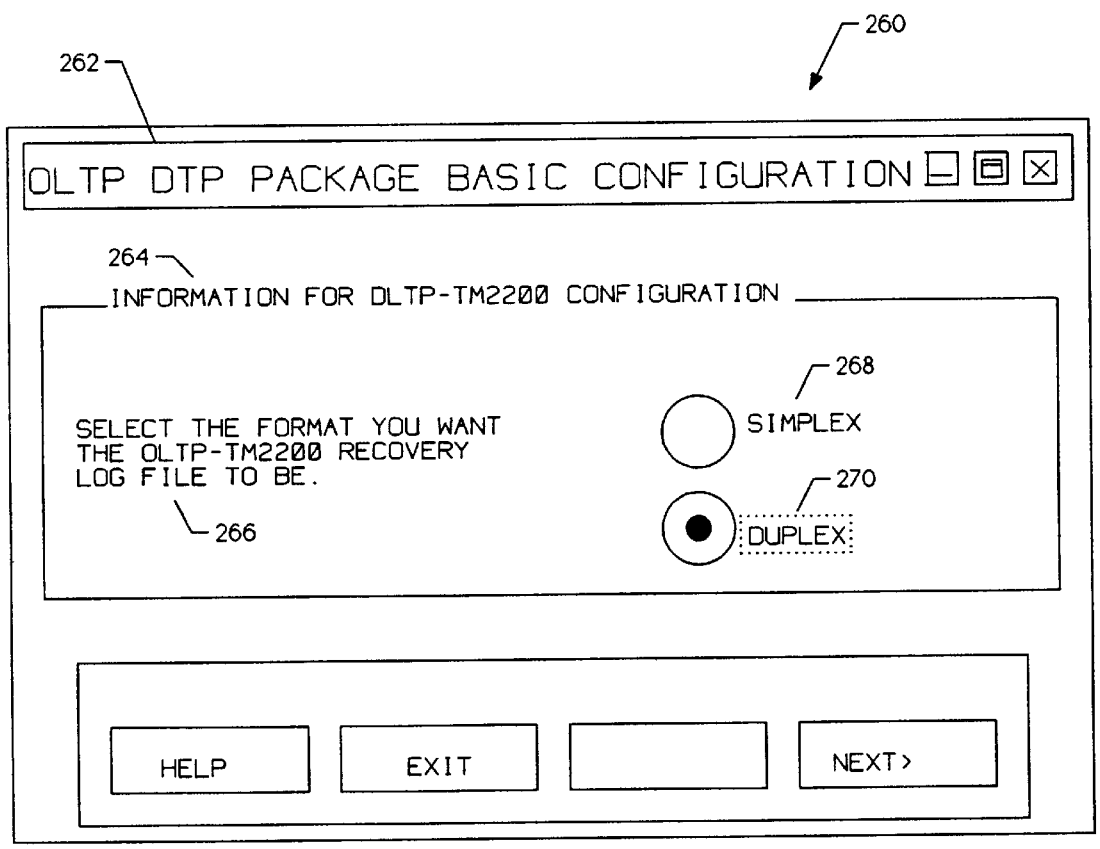
FIG. 8 is a view of a screen of the first embodiment requesting information for the OLTP-TM2200 configuration.

FIG. 8 is a view of a screen of the first embodiment requesting information for the OLTP TM2200 configuration. Window 260 is shown in FIG. 8 and corresponds to element 126 as shown in FIG. 3. Window 260 includes part of the user response of element 126. Window 260 indicates at 262 the OLTP DTP package basic configuration where the request at 264 indicates information for OLTP TM2200 configuration. Window 260 requests at 266 that the user select the format for the OLTP-TM2200 recovery log file.

The potential responses are shown at 268 as simplex and at 270 as duplex. Here, duplex at 270 has been indicated as a representative response.

Figure 9:
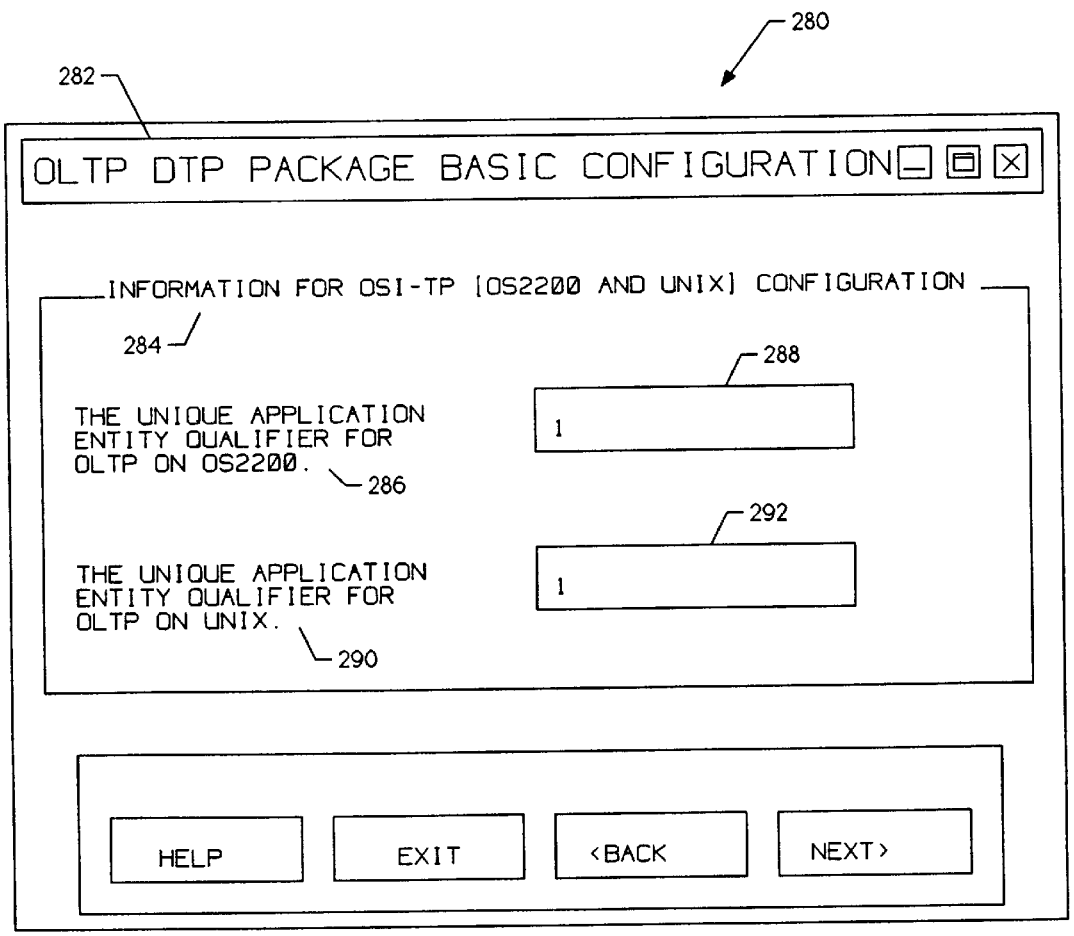
FIG. 9 is a view of a screen of the first embodiment requesting information for the OSI-TP (OS 2200 and UNIX) configuration.

FIG. 9 is a view of a screen of the first embodiment requesting information for the OSI TP (OS2200 and UNIX) configuration. Window 280 includes part of the user response from element 126 shown in FIG. 3. Window 280 indicates at 282 the OLTP DTP package basic configuration and indicates the request for information for OSI-TP (OS2200 and UNIX) configuration at 284. Window 280 requests the unique application entity qualifier for OLTP on OS2200 at 286, and the user response is entered at 288. Window 280 requests the unique application entity qualifier for OLTP on UNIX at 290. The user response is input at 292.

Figure 10:
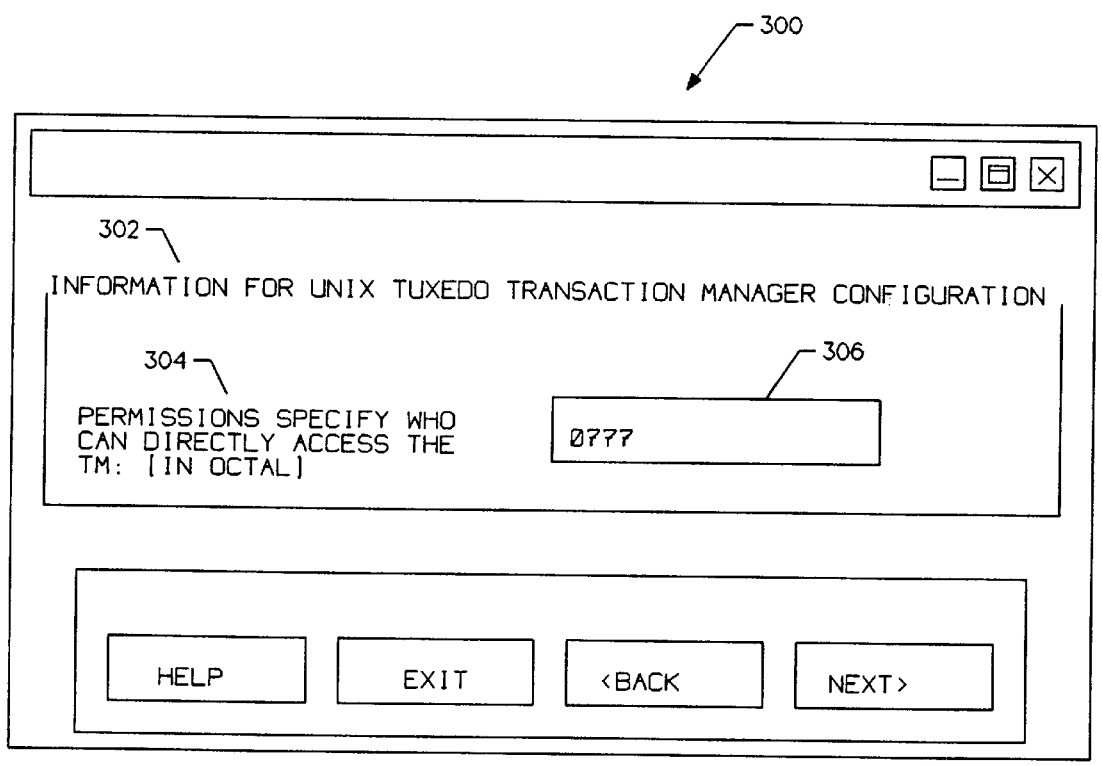
FIG. 10 is a view of a screen of the first embodiment requesting information for the UNIX TUXEDO transaction manager configuration.

FIG. 10 is a view of a screen on the first embodiment requesting information for the UNIX TUXEDO transaction manager configuration. Window 300 includes part of the user response of element 126 as previously discussed in FIG. 3. Window 300 indicates information for UNIX TUXEDO transaction manager configuration at 302, and requests permission specifying who can directly access the TM in octal at 304. The user response is entered at 306.

Figure 11:
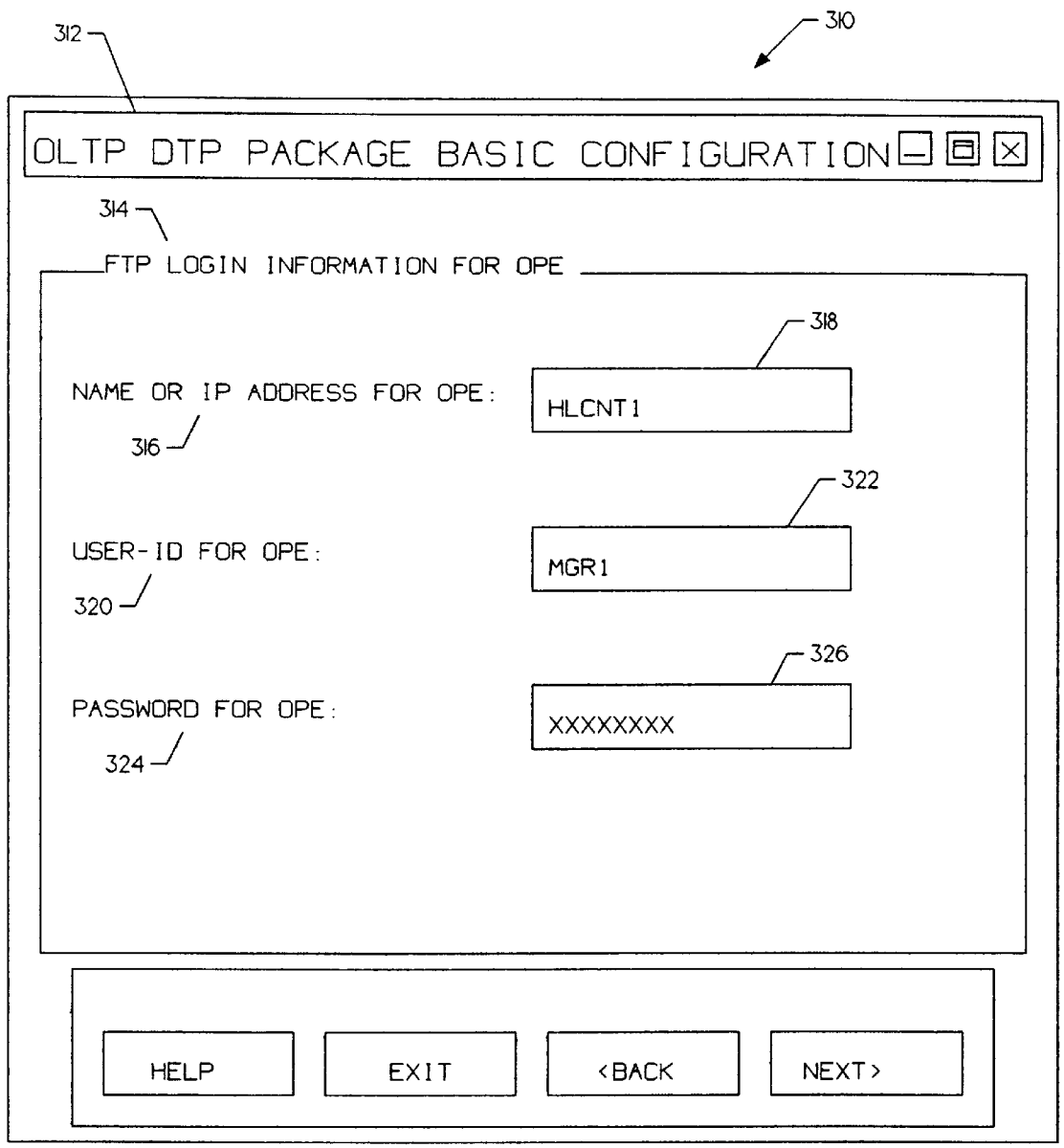
FIG. 11 is a view of a screen of the first embodiment requesting information for the OLTP DTP package configuration.

FIG. 11 is a view of a screen of the first embodiment requesting information for the OLTP DTP package basic configuration. Window 310 corresponds to element 134 previously described in FIG. 3. Window 310 provides a user response to element 134 which solicits file transfer protocol for login requirements for OS2200 platform 12. Window 310 indicates OLTP DTP package basic configuration at 312, and indicates FTP login information for OPE at 314. The first request for FTP login information for OPE is at 316 and is the name or IP address for OPE, and the user response is entered at 318. The user ID for OPE is requested at 320, and the user response is entered at 322. The password for OPE is requested at 324, and the user response is entered at 326. Window 310 provides the user input for element 134 of FIG. 3.

Figure 12:
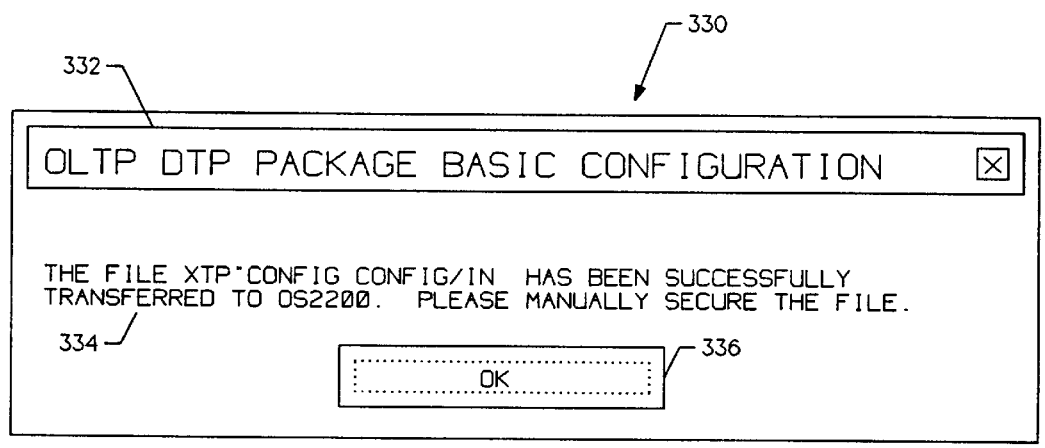
FIG. 12 is a view of a screen of the first embodiment requesting acknowledgement that files have been transferred to the OS 2200 platform.

FIG. 12 is a view of a screen of the first embodiment indicating that files have been successfully transferred to the OS2200 platform. Window 330 notifies the user of the successful transfer of files once decisional element 146, previously discussed in FIG. 3, indicates a successful file transfer has occurred. The OLP DTP package basic configuration is indicated at 332 and 334 indicates that the particular configuration file has been successfully transferred to the OS2200. The user affirms the message of window 330 by clicking the icon at 336.

Figure 13:
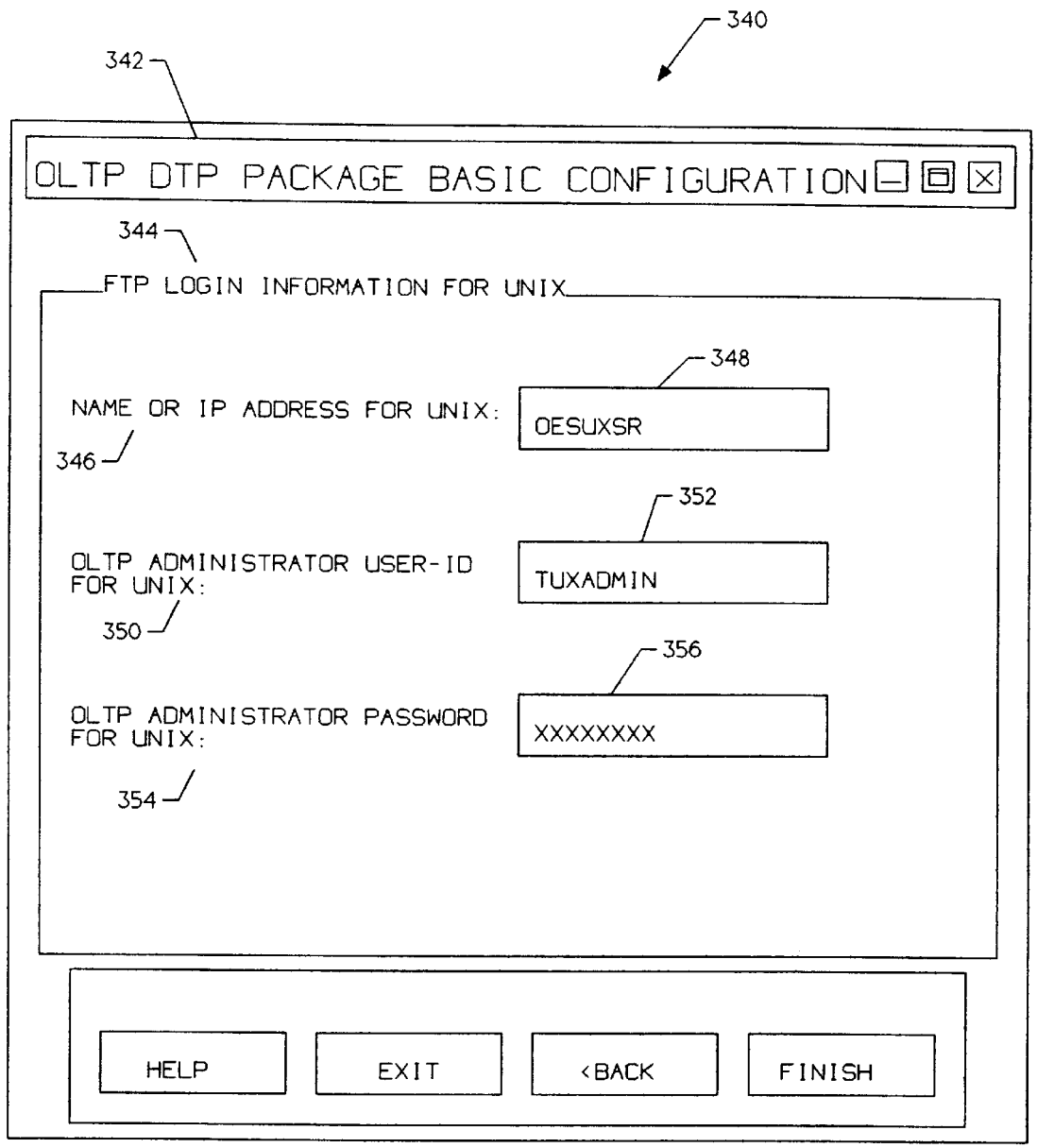
FIG. 13 is a view of a screen of the first embodiment requesting file transfer protocol login information for the UNIX platform.

FIG. 13 is a view of a screen of the first embodiment requesting file transfer protocol login information for UNIX platform 14. Window 340 corresponds to element 152 previously discussed in FIG. 3. Element 152 solicits file transfer protocol login requirements for UNIX platform 14. Window 340 indicates OLTP DTP package basic configuration at 342 and indicates the request for FTP login information for UNIX at 344. The first request is for a name or IP address for UNIX at 346. The user response is entered at 348. The next request is for OLTP administrator user-ID for UNIX at 350. The user response is entered at 352. Next, the OLTP administrator password for UNIX is requested at 354. The user response is input at 356.

Figure 14:
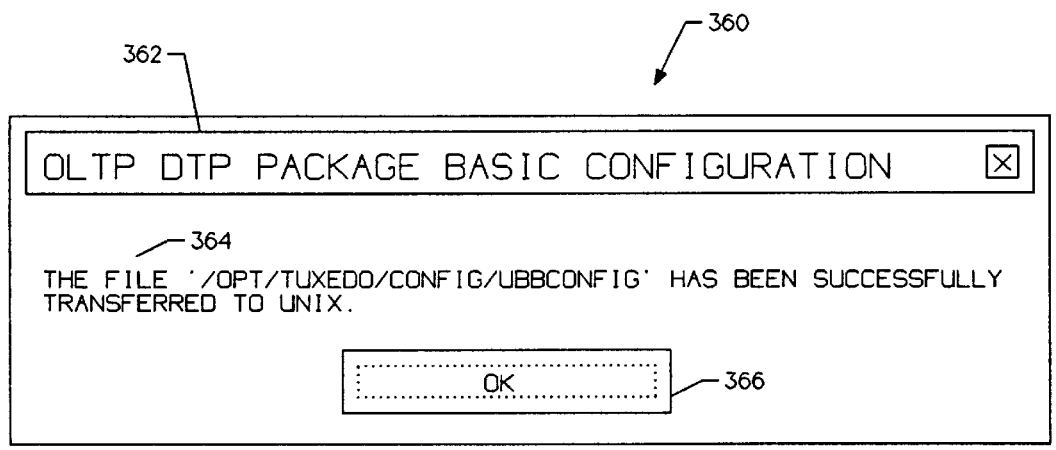
FIG. 14 is a view of a screen of the first embodiment requesting acknowledgement that files have been transferred to the UNIX platform.

FIG. 14 is a view of a screen of the first embodiment indicating that files have been successfully transferred to the UNIX platform. Window 360 is displayed after decisional element 164 indicates that the file transfer was successful. The OLTP DTP package basic configuration is indicated at 362 and the indication of the successful file transfer to UNIX is indicated at 364. The user affirms the message by clicking the icon at 366.

Figure 15:
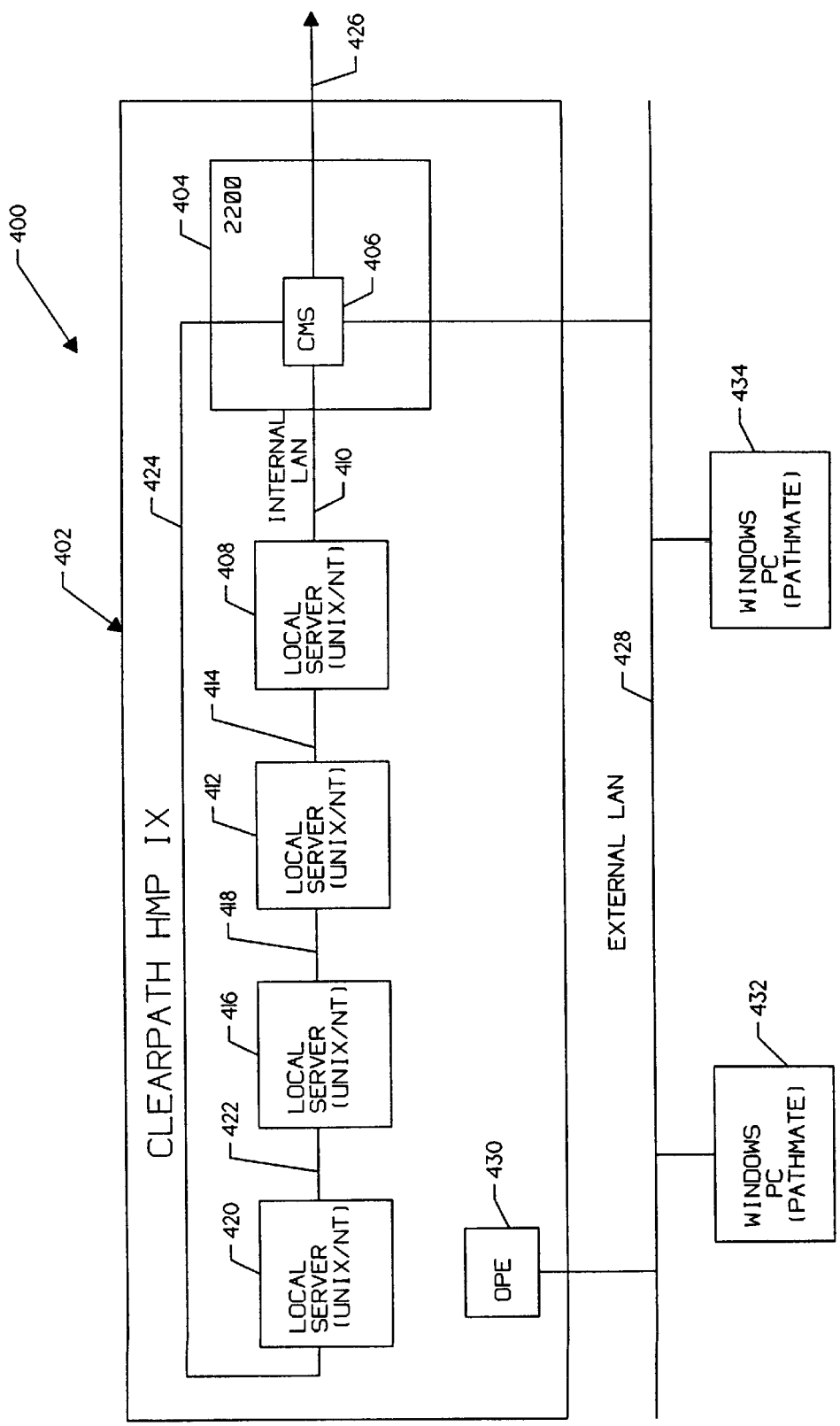
FIG. 15 is a block diagram of the hardware configuration of a second embodiment.

FIG. 15 shows a CLEARPATH system at 400 which consists of a 2200 platform 404 connected via an internal FDDI fiber optics network to four local servers that may be either NT or UNIX workstations. Communication management system 406 is located within 2200 platform 404 and is the primary network communication product for the OS2200 operating environment. Communication management system 406 is coupled to local server 408 via internal LAN 410. Local server 408 is coupled to local server 412 via internal LAN 414. Local server 412 is coupled to local server 416 via internal LAN 418. Local server 416 is coupled to local server 420 via internal LAN 422. Local server 420 is coupled to communications management system 406 via internal LAN 424. Communications management system 406 has various other dedicated communication channels to connect 2200 platform 404 to other distributed communication processors that in turn connect to various other mainframes, LAN networks and other terminals.

The CLEARPATH HMP IX system at 402 is further coupled to an external local area network 428 which may interface to other various WINDOWS PCs workstations or desktop computers, including PCs running the PATHMATE help systems. Communications management system 406 is coupled to WINDOWS PC 432 and WINDOWS PC 434 via external LAN 428. OPE 430 is a UNIX simulator which allows a user on the 2200 mainframe to execute within a UNIX environment on the mainframe. OPE 430 is located within the CLEARPATH HMP IX system 402 and is coupled to WINDOWS PC 432 and WINDOWS PC 434 via external LAN 428.

All communications with 2200 platform 404 is coordinated by communications management system 406. Software executed by communications management system 406 to perform this coordination complies with the industry-recognized OSI 7-layer communications model. To coordinate communications, communications management system 406 must be aware of the IP addresses of the various nodes, and must further be aware of the topology of the various networks within the system. This information is contained within a configurations file.

ConfigAce is a configurations program which is used to configure different unrelated CLEARPATH products. These products may include CMS 1100 (e.g., communications management system 406), which is a communications program to control the communication between 2200 platform 404 and selected other nodes within the system. These products may also include: DEPCON PC, which is a print server which allows print files to be received from 2200 platform 404 and printed on a WINDOWS PC or NT server; DEPCON 2200 which is a print server for 2200 platform 404; OLTP-TM 2200 which is a transaction monitor which facilitates database transactions on the 2200 platform 404; and OPE (e.g., OPE 430).

Each of these products have a configuration file that contains information such as IP internet addresses and various local area network information. When CLEARPATH HMP IX 402 is first used, the configuration files must be newly created or modified to reflect the new communications networks and IP addresses associated within a particular CLEARPATH system. If the CLEARPATH HMP IX 402 system is interconnected to an existing system, the configuration files must be changed to contain the updated configuration information. The ConfigAce program makes the required changes. The ConfigAce program is part of the PATHMATE system which has been described in the co-pending applications "Operator Assistance for Heterogeneous Data Processing Systems" and "Operator Assistance for Data Processing Systems", which have been incorporated herein by reference.

It is understood that the application programs listed above including CMS 1100, DEPCON PC, DEPCON 2200, OLTP-TM 2200, and OPE, may also include distributed application programs which are distributed on a number of computer platforms. For example, the distributed application program may include a plurality of distributed application program portions, wherein each portion is resident on a corresponding computer platform. In this example, one portion of a distributed application program may be resident on the 2200 platform 404, while another portion may be resident on local server 408. Communication to each of these distributed application program portions may be accomplished via WINDOWS PC 432 or WINDOWS PC 434.

Figure 16:
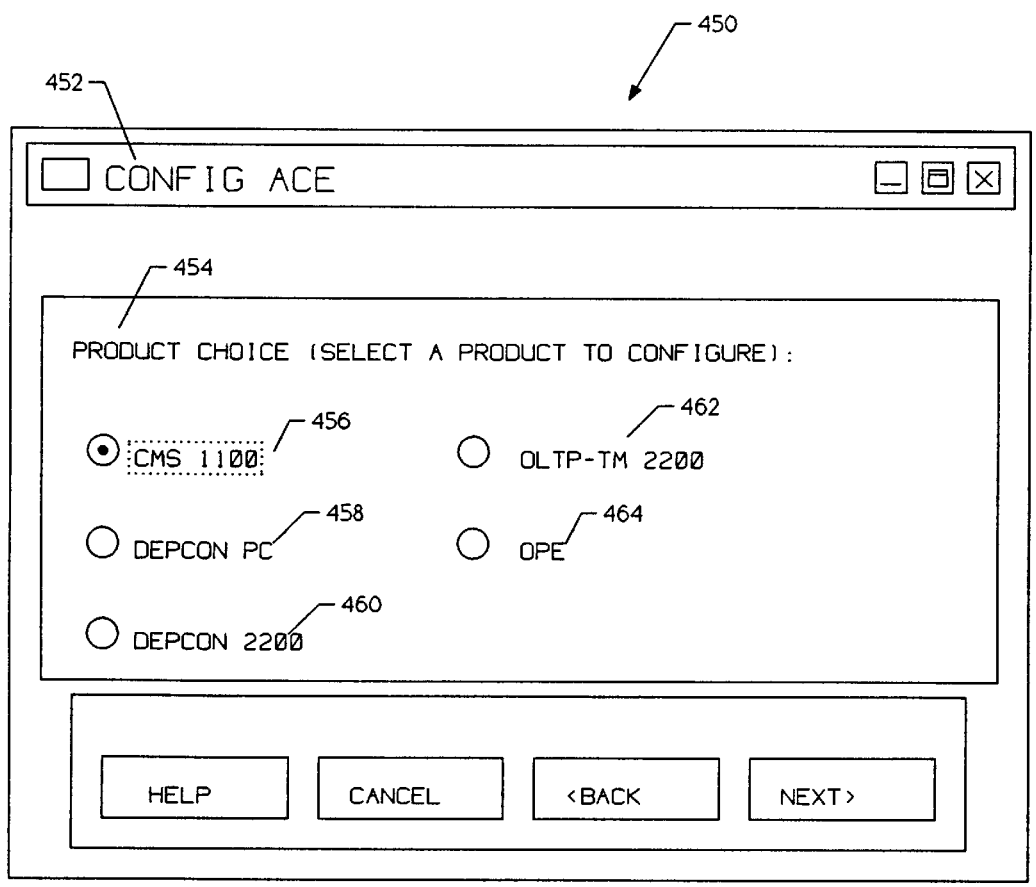
FIG. 16 is a view of a screen of PATHMATE of the second embodiment requesting selection of a product to configure.

FIG. 16 is a view of a screen of PATHMATE of the second embodiment requesting selection of a product to configure. Window 450 indicates the ConfigAce application at 452. The query presented to the user to select a product choice for a product to configure is shown at 454. The product choices include CMS 1100 at 456, DEPCON PC at 458, DEPCON 2200 at 460, OLTP-TM 2200 at 462, and OPE at 464. Window 450 shows a selection of CMS 1100 at 456. It is understood that the subsequent information requested by ConfigAce may be specific to each product choice.

CMS 1100 at 456 is selected when a user initially installs a CLEARPATH HMP IX 402 system where old configuration files must be modified to include information about the newly installed CLEARPATH HMP IX 402 system. The old configuration file or CMS file may be the configuration file existing on the 2200 platform 404 or Unisys 1100 system, wherein the user is upgrading to the CLEARPATH HMP IX 402 system. This may also be the default configuration file shipped with the 2200 platform 404. Many of the modifications for CLEARPATH are hardcoded (the user is not allowed to specify any of the associated information). Other information must be provided during CMS 1100 configuration. Communications management system 406 may create a change file that is to be applied against an old file to create the new configuration management system configuration file for CLEARPATH.

Figure 17:
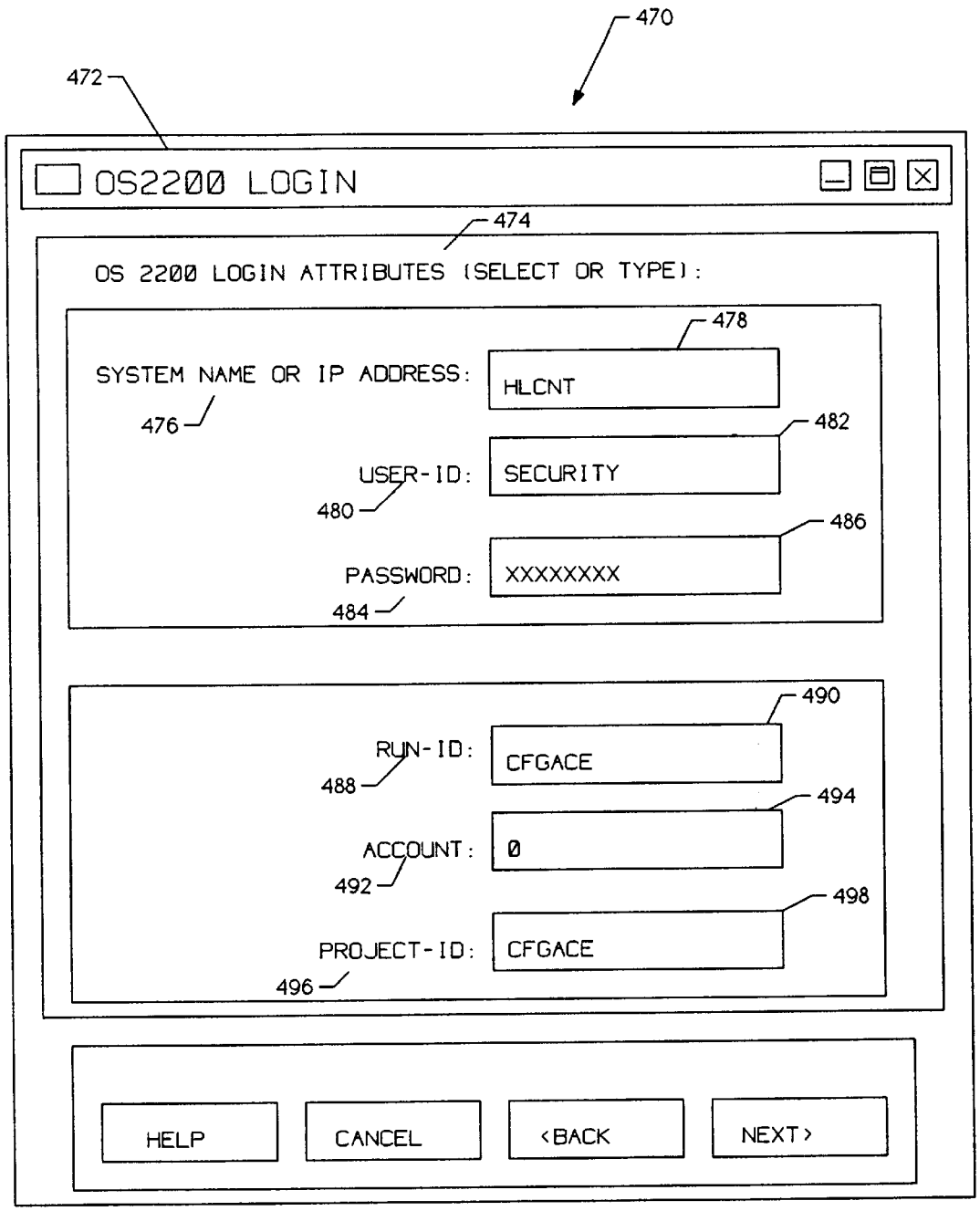
FIG. 17 is a view of a screen of the second embodiment requesting OS 2200 login attributes.

FIG. 17 is a view of a screen of the second embodiment requesting OS2200 login attributes. Once CMS 1100 is selected at 456 in window 450, window 470 indicates OS2200 login at 472 and requests OS2200 login attributes at 474. The system name or IP address is requested at 476, and the user response is input at 478. These responses may be input by typing or may be selected. The user ID is requested at 480 and the user response is indicated at 482. A password is requested at 484 and the user response is input at 486. A run ID is requested at 488 and the user response is input at 490. An account is requested at 492 and the user response is input at 494. The project ID is requested at 496 and the user response is input at 498. Window 470 thus queries the user for OS2200 login information needed for billing, security and file access control, and thus, includes account number, run ID and password information. Once this information is supplied, the user is logged onto the 2200 platform 404. This login process needs to only be performed once during a single ConfigAce session.

Figure 18:
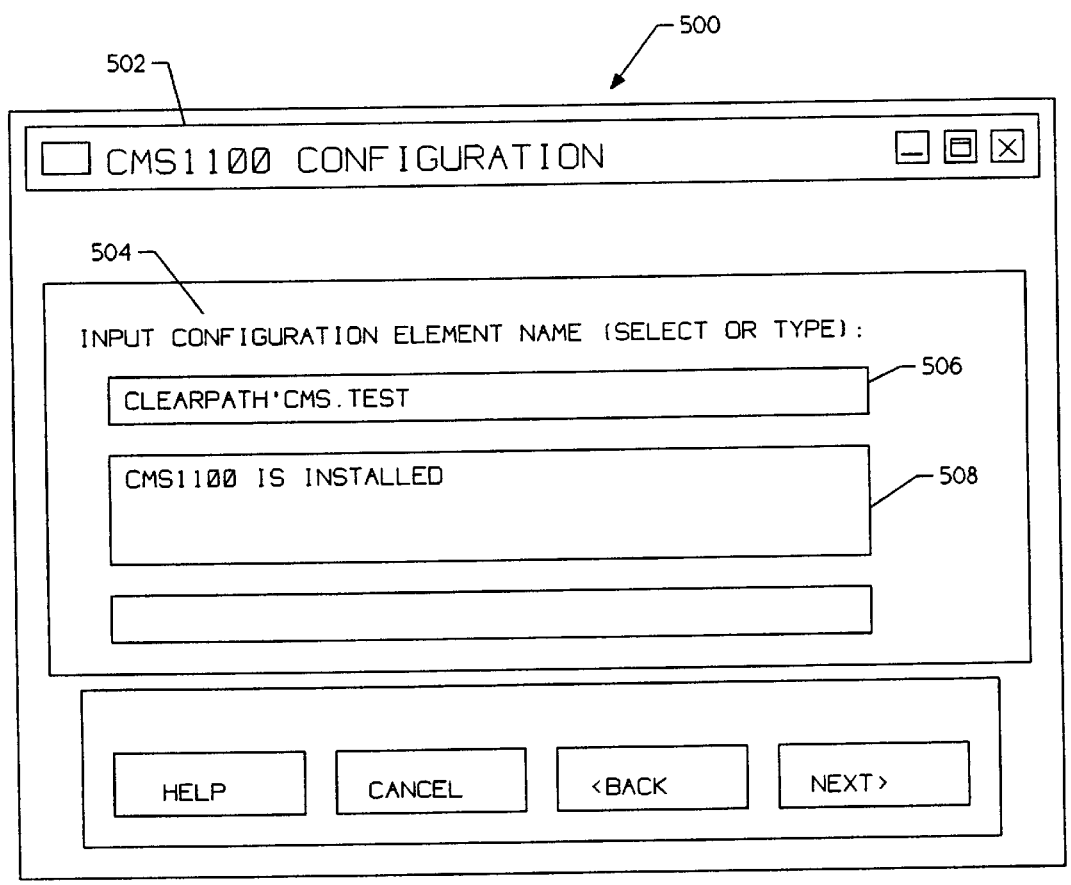
FIG. 18 is a view of a screen of the second embodiment requesting an input configuration element name.

FIG. 18 is a view of a screen of the second embodiment requesting an input configuration element name. Window 500 allows the user to provide the name of the old "default"

CMS configuration file on 2200 platform 404 which will be modified to include the new CLEARPATH HMP IX 402 configuration information. Window 500 indicates the CMS 1100 configuration at 502 and indicates the request of the input configuration element name at 504. The CMS configuration file name is shown at 506 and an indication is provided at 508 that CMS 1100 is installed.

Figure 19:
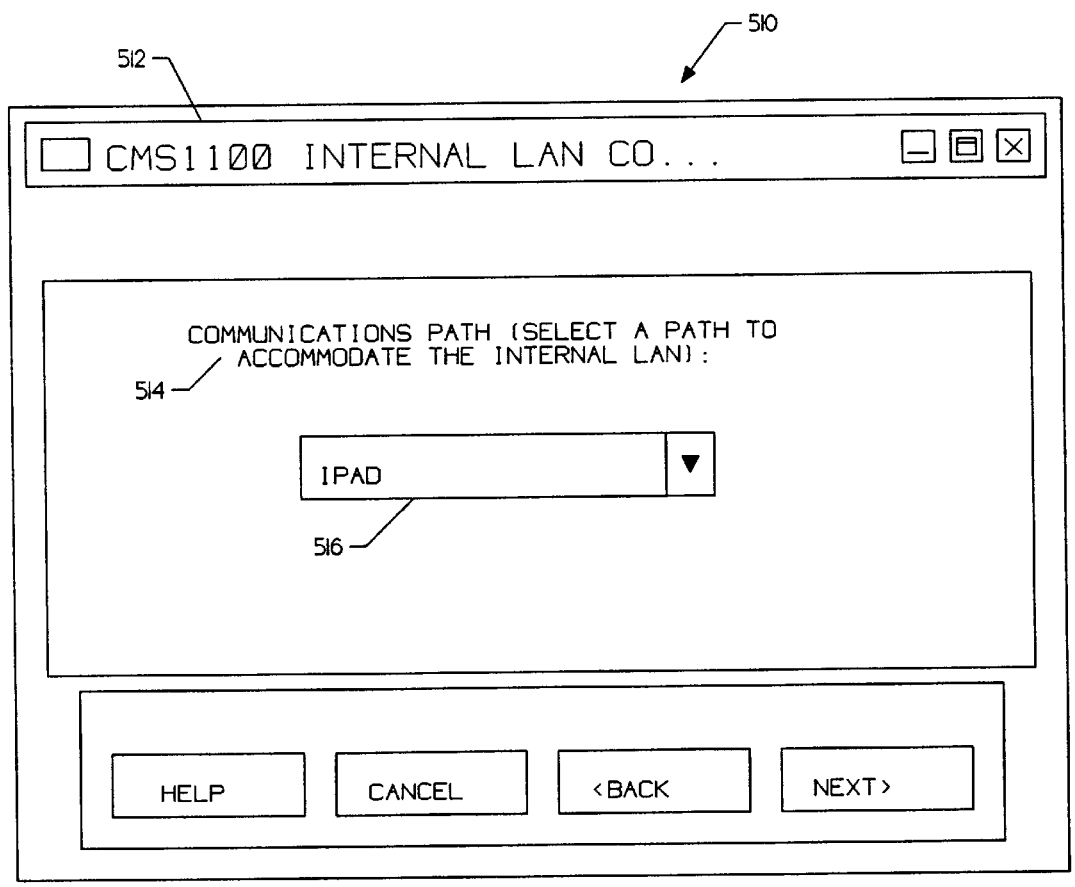
FIG. 19 is a view of a screen of the second embodiment requesting selection of a communication path to accommodate the internal Local Area Network (LAN)

FIG. 19 is a view of a screen of the second embodiment requesting selection of a communication path to accommodate the internal local area network (LAN). Window 510 allows the user to specify the path for the internal LAN 410 as shown in FIG. 1. Window 510 indicates CMS 1100 internal LAN at 512 and requests the communications path selection to accommodate the internal LAN at 514. The user response is input or selected at 516.

Figure 20:
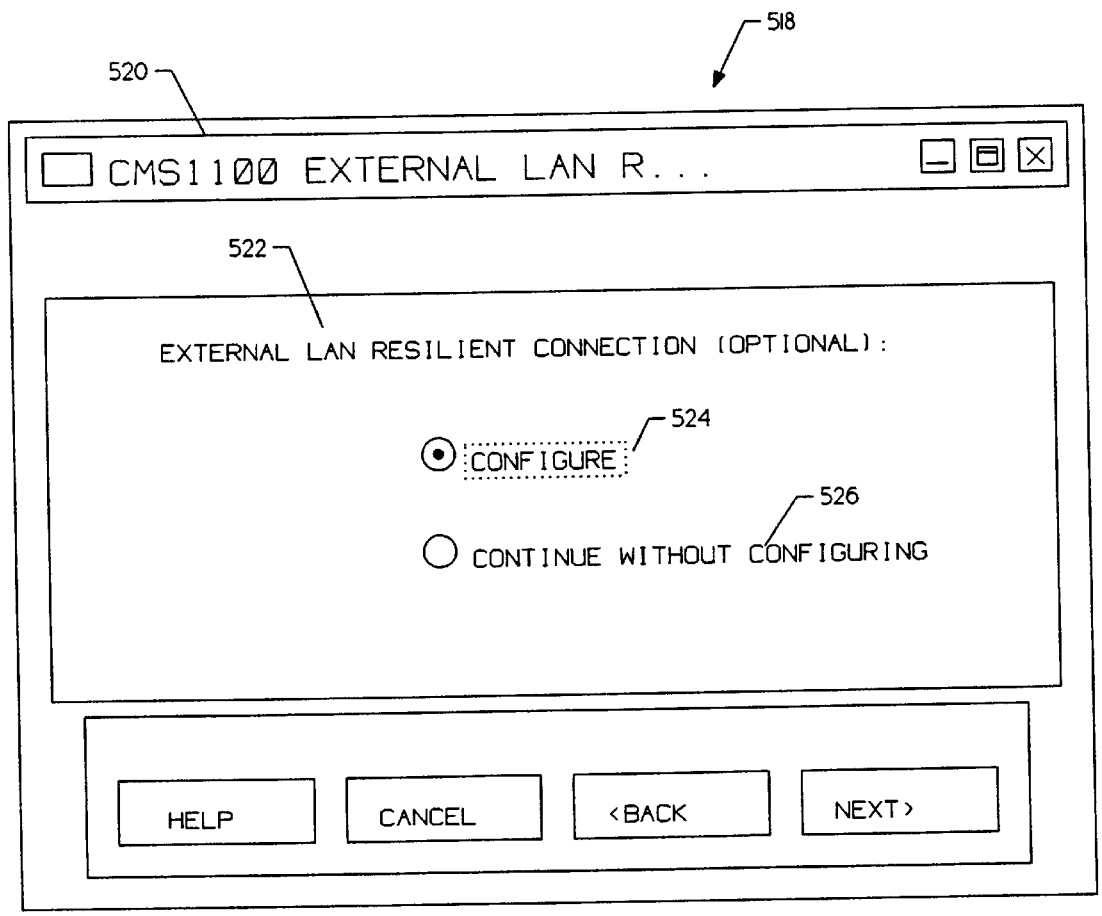
FIG. 20 is a view of a screen of the second embodiment requesting selection of an external LAN connection.

FIG. 20 is a view of a screen of the second embodiment requesting selection of an external LAN connection. Window 518 selects whether or not to configure an external LAN resilient connection which can be thought of as "spare" external LAN included within CLEARPATH systems for use in the event a fault occurs in the primary external LAN. Window 518 indicates CMS 1100 external LAN at 520 and requests an external LAN resilient connection at 522. The user has the option of selecting configure at 524 or continue without configuring at 526. Window 518 shows a selection of configure at 524.

Figure 21:
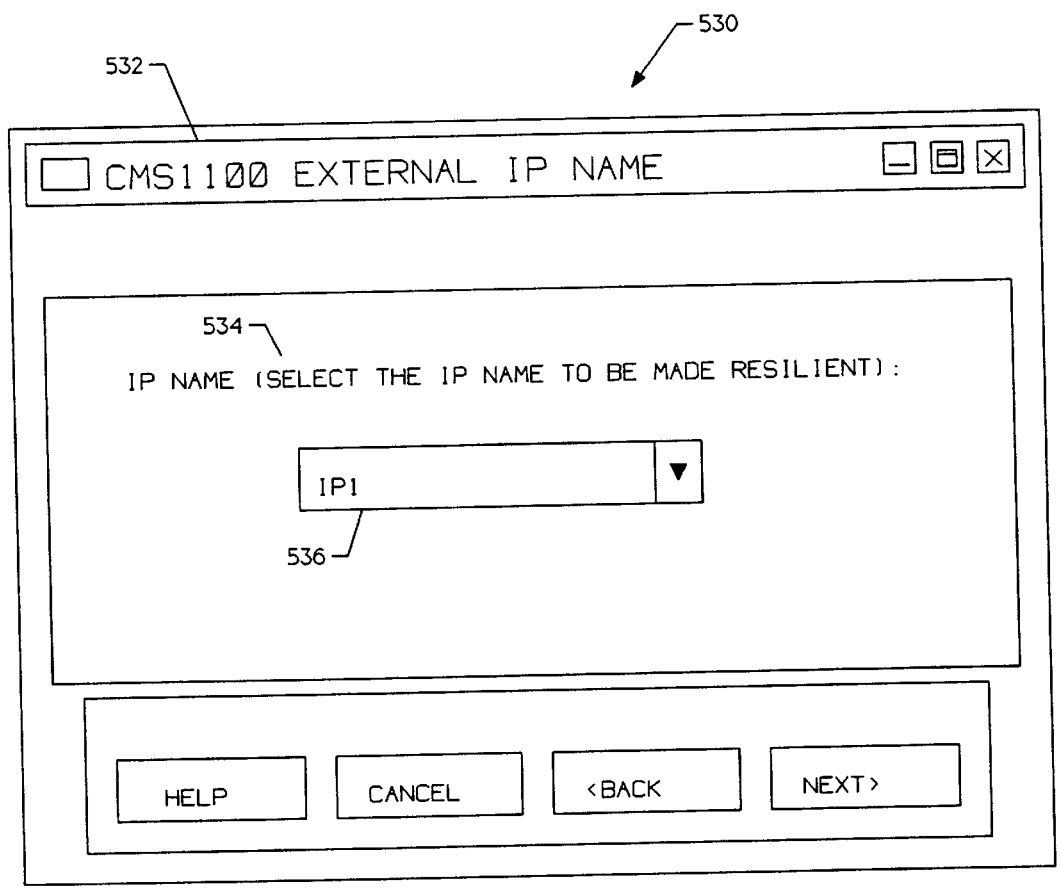
FIG. 21 is a view of a screen of the second embodiment requesting selection of an internet protocol (IP) address.

FIG. 21 is a view of a screen of the second embodiment requesting selection of an internet protocol (IP) address. Window 530 selects the IP name for the resilient external LAN. Window 530 indicates the CMS 1100 external IP name at 532 and requests the IP name to be made resilient at 534. The user response is input or selected at 536.

Figure 22:
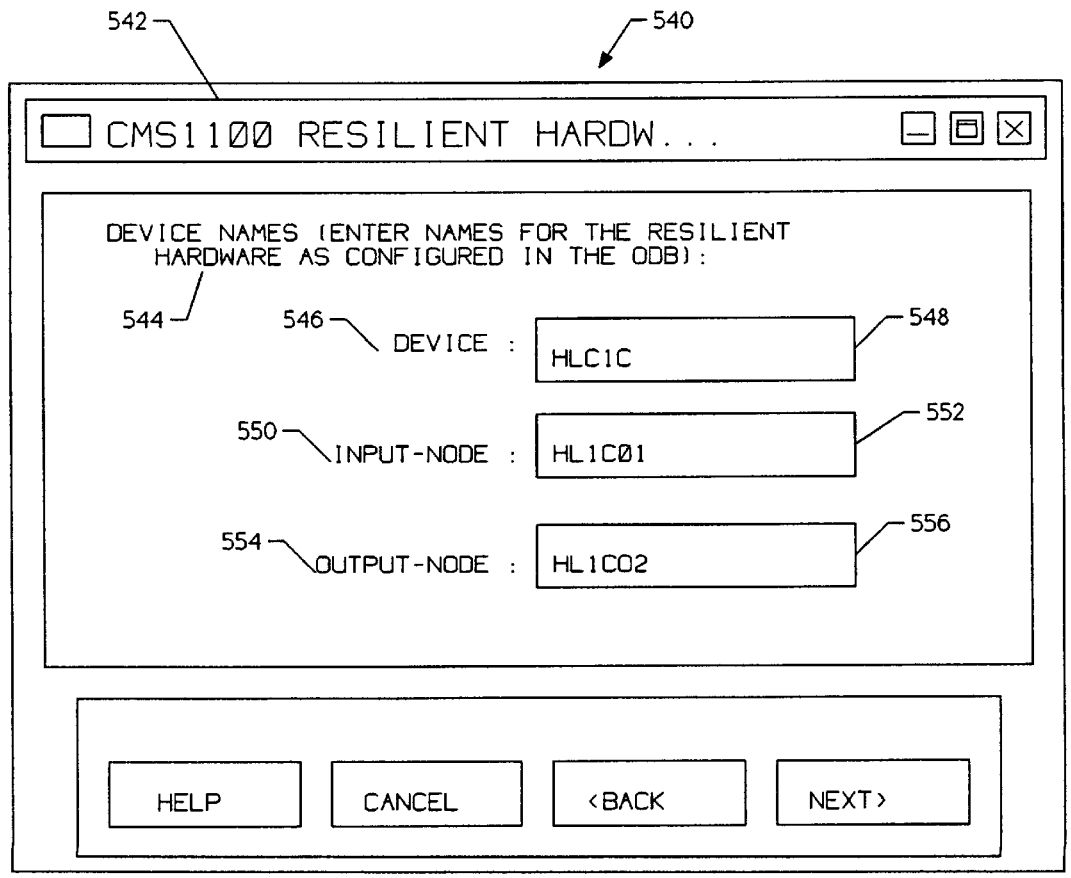
FIG. 22 is a view of a screen of the second embodiment requesting hardware device names.

FIG. 22 is a view of a screen of the second embodiment requesting hardware device names. Window 540 solicits additional information about the resilient hardware. Window 540 indicates CMS 1100 resilient hardware at 542 and requests device names to be entered for the resilient hardware as configured in the ODB at 544. Window 540 requests a device at 546 and the user response is input at 548. Window 540 requests an input-node at 550 and the user response is input at 552. The request for output node is indicated at 554 and the user response is input at 556.

Figure 23:
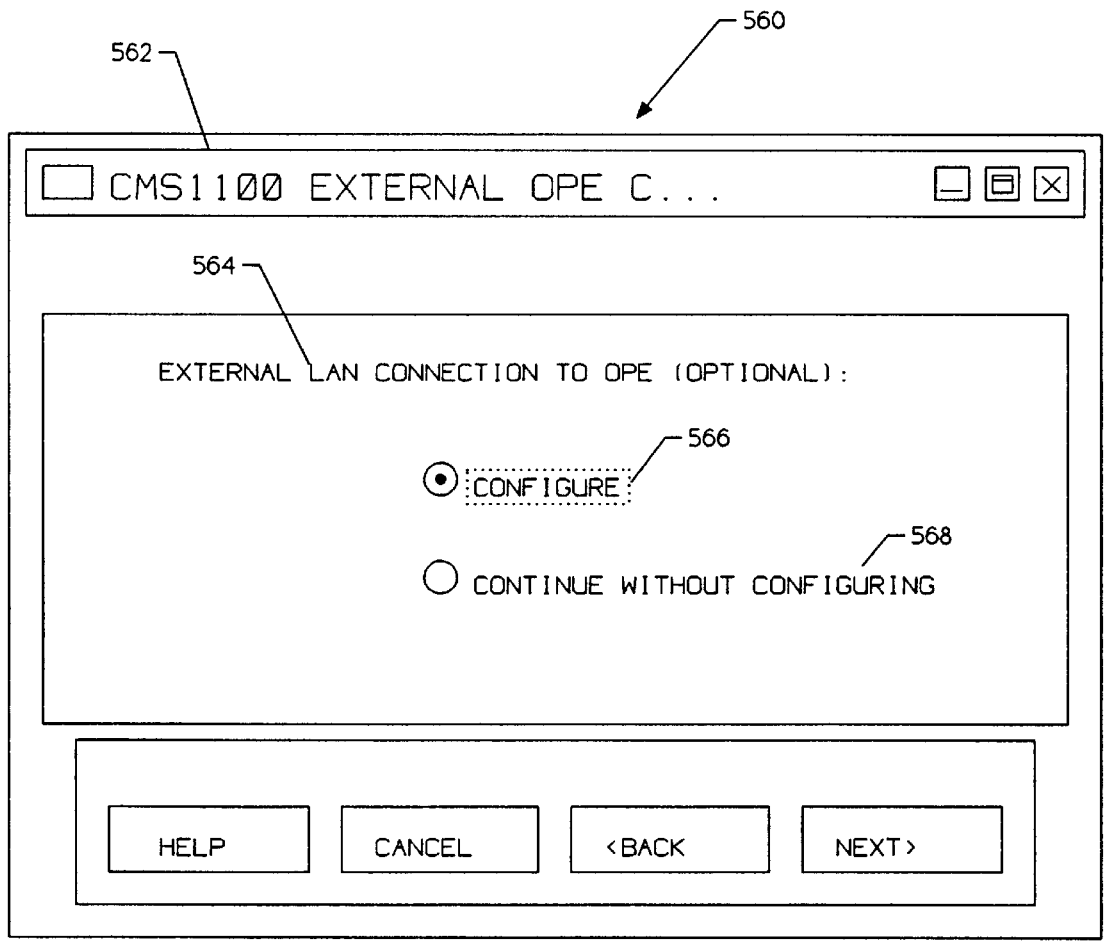
FIG. 23 is a view of a screen of the second embodiment requesting selection of an external LAN connection to OPE.

FIG. 23 is a view of a screen of the second embodiment requesting selection of an external LAN connection to OPE 430. Window 560 indicates a CMS 1100 external OPE connection at 562 and requests an external LAN to OPE at 564. The user has the option of selecting configure at 566 or continue without configuring at 568. Window 560 shows configure at 566 being selected.

Figure 24:
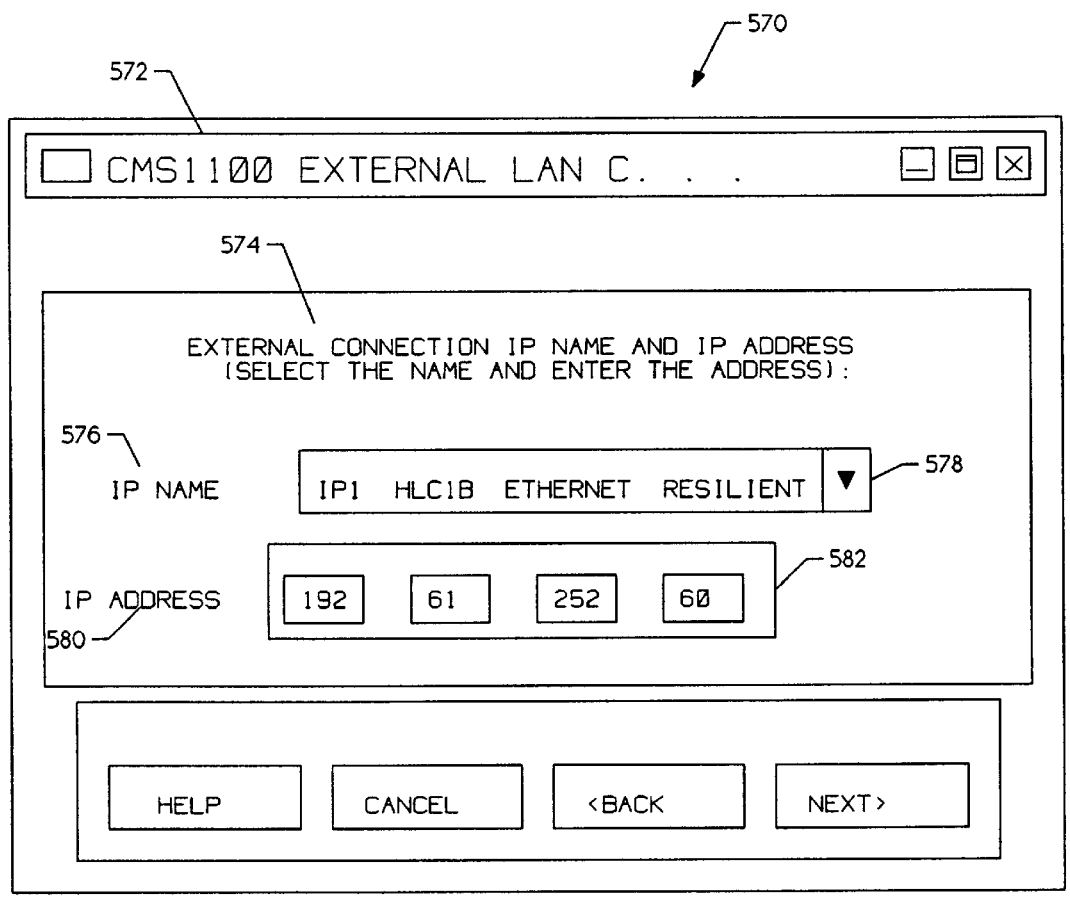
FIG. 24 is a view of a screen of the second embodiment requesting an external connection IP name and IP address.

FIG. 24 is a view of a screen of the second embodiment requesting an external connection IP name and IP address. Window 570 allows the user to specify the IP address for the external LAN. Window 570 indicates CMS 1100 external LAN connection at 572 and requests an external connection IP name and IP address at 574. The IP name is requested at 576 and the user inputs or selects a response at 578. The IP address is requested at 580 and the user inputs or selects a response at 582.

Figure 25:
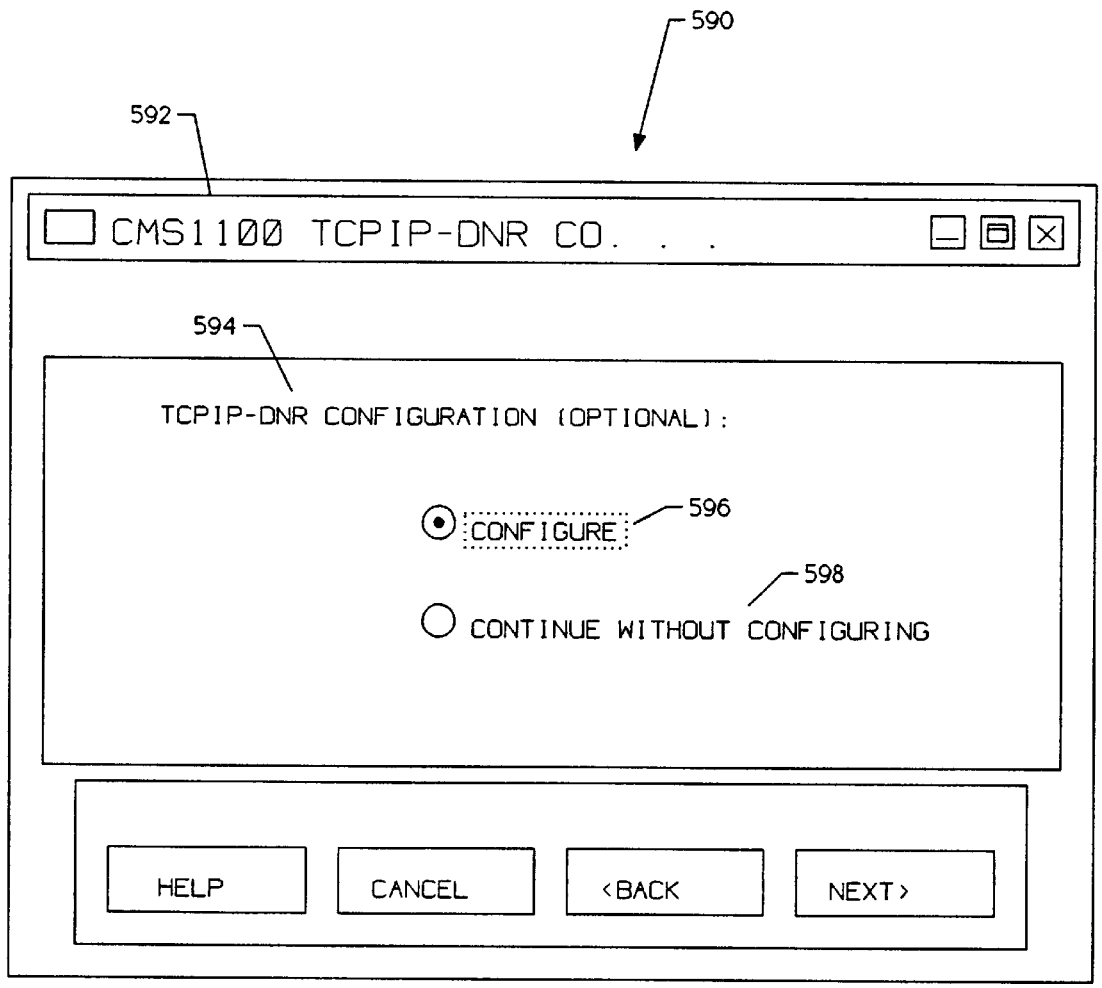
FIG. 25 is a view of a screen of the second embodiment requesting a TCPIP-DNR configuration.

FIG. 25 is a view of a screen of the second embodiment requesting a TCPIP-DNR configuration. Window 590 allows creation of the TCPIP-DNR statement in the configuration file. This statement indicates to the system how to map server names to IP addresses. Window 590 allows the user to select whether or not to create the TCPIP-DNR statement. Window 590 indicates CMS 1100 TCPIP-DNR configuration at 592 and requests the TCPIP-DNR configuration at 594. The user has the option of selecting configure at 596 or continue without configuring at 598. Window 590 indicates a selection of configure at 596. If the user elects to continue without creating by selecting 598, default values are used to map IP addresses to nodes.

Figure 26:
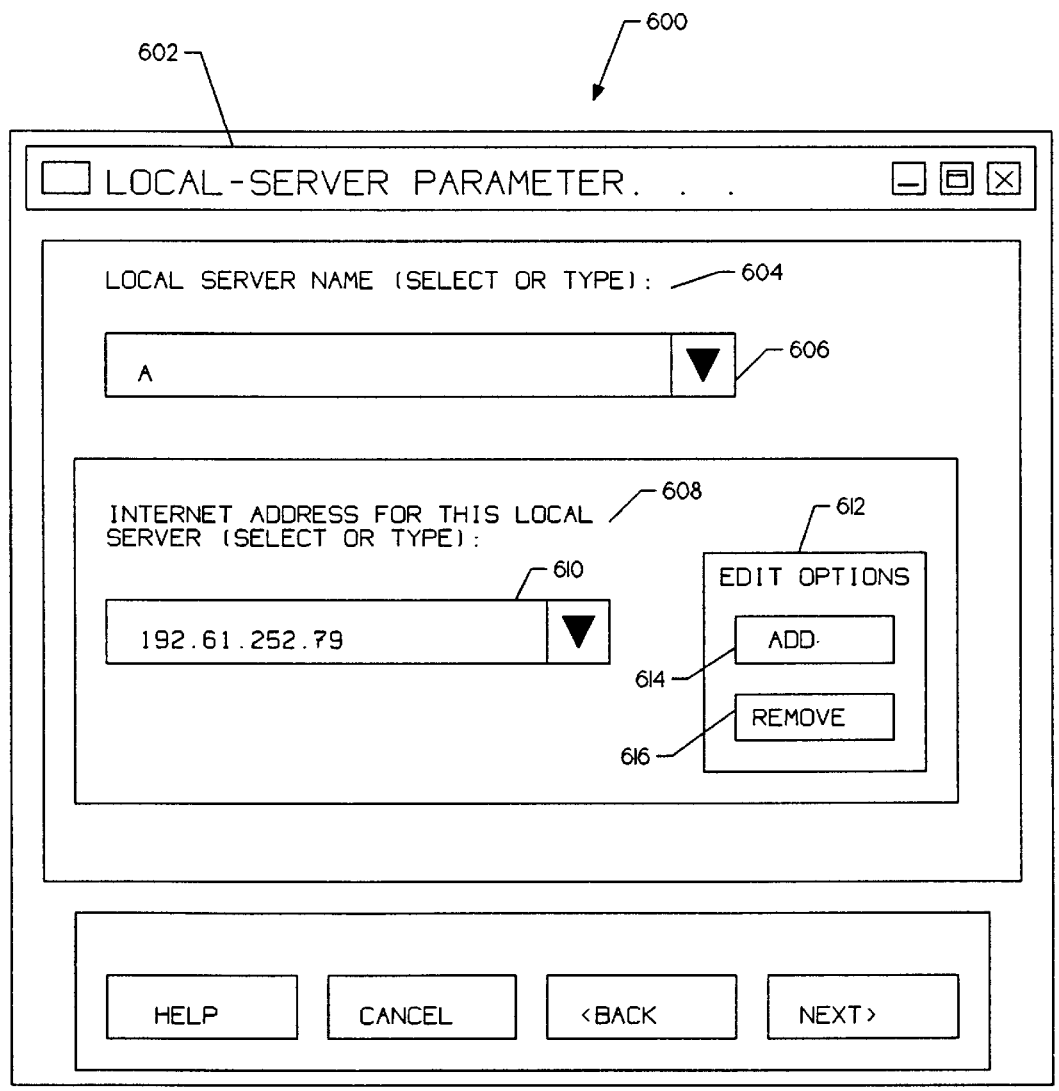
FIG. 26 is a view of a screen of the second embodiment requesting a local server name and an internet address for the local server.

FIG. 26 is a view of a screen of the second embodiment requesting a local server name and an internet address for the local server. Window 600 allows the user to type in the names of a local server. These names could be, for example, the name of local server 408, local server 412, local server 416, or local server 420, as well as WINDOWS PC 432 or WINDOWS PC 434. The user also specifies an IP address and can enter as many addresses for as many nodes as desired. Each entry is added to the CMS configuration file. Window 600 indicates at 602 the local server parameters and requests the local server name at 604 which is selected or typed at 606. Window 600 requests an internet address for the local server at 608 and the user selects or types the address at 610. Window 600 also includes edit options indicated at 612 which included adding an internet address by clicking on icon 614 or removing an internet address by clicking on icon 616.

Figure 27:
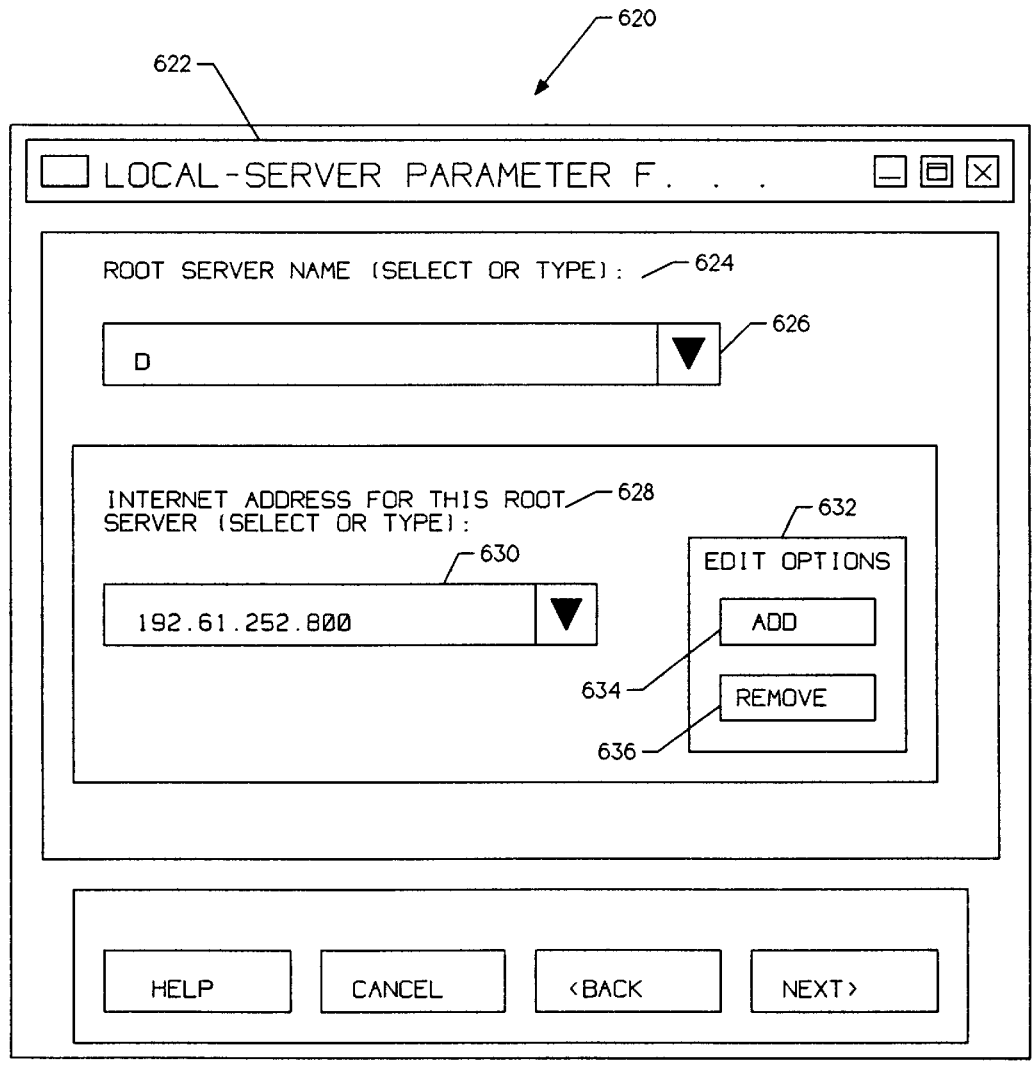
FIG. 27 is a view of a screen of the second embodiment requesting a root server name and an internet address for the root server.

FIG. 27 is a view of a screen of the second embodiment requesting a root server name and an internet address for the server. Window 620 allows a user to enter the name of root server and a corresponding internet address. A root server is associated with a predetermined number of local servers. The root server is entered into the CMS configuration file. Window 620 indicates the root server parameter at 622 and requests a root server name at 624. The user selects or types in the root server name at 626. Window 620 asks for the internet address for the root server at 628 where the user types in or selects the internet address at 630. Window 620 also includes the edit options at 632 which include adding an internet address by clicking the icon on 634, or removing an internet address by clicking the icon on 636.

Figure 28:
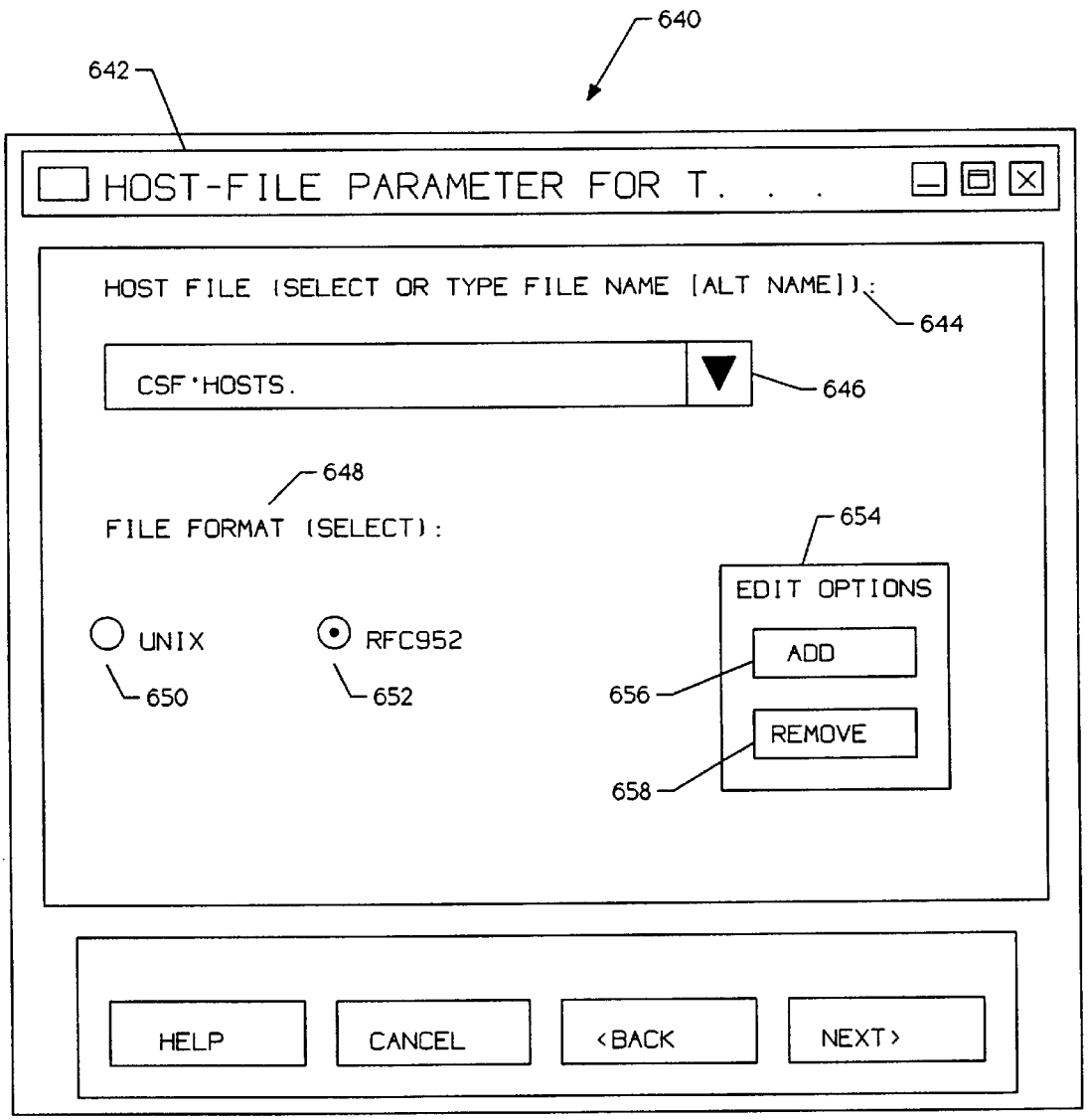
FIG. 28 is a view of a screen of the second embodiment requesting a host file name and file format.

FIG. 28 is a view of a screen of the second embodiment requesting a host file name and a file format. Window 640 allows the user to enter the name of an Xhost file that will contain a list of servers and corresponding IP addresses. This file name is entered into the CMS configuration file. Window 640 indicates host file parameter at 642 and requests the host file at 644. The user selects or types in the host file name at 646. Window 640 requests a file format at 648 and the user selects either the UNIX file format at 650 or the RFC 952 format at 652. Window 640 also provides edit options at 654 which include adding a host file by clicking the icon at 656 or removing a host file by clicking the icon at 658.

Figure 29:
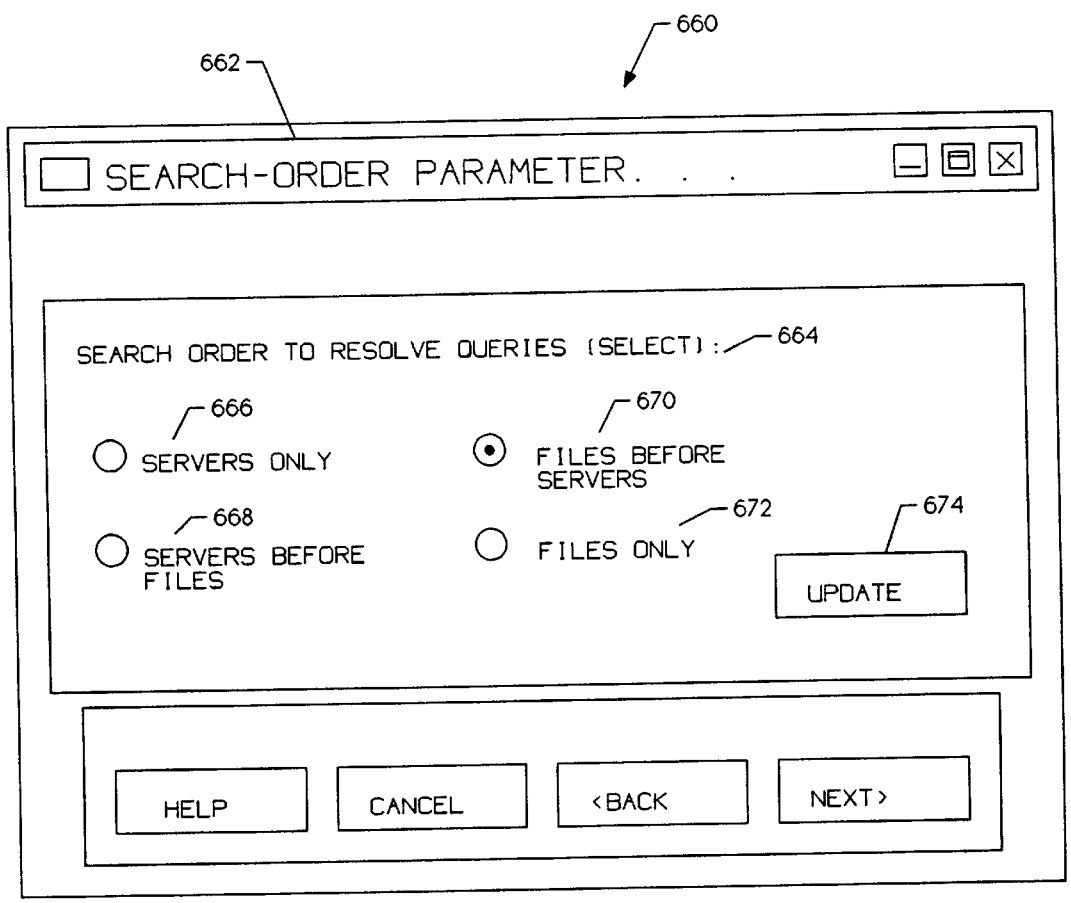
FIG. 29 is a view of a screen of the second embodiment requesting selection of a search order to resolve queries.

FIG. 29 is a view of a screen of the second embodiment requesting selection of a search order to resolve queries. The mapping of a server name to an IP address can occur by searching for the server name at any of three places. First, the CMS configuration file can be searched to map the local server name to the IP address. This information was provided by the user in windows 600 shown in FIG. 26. Second, all server names corresponding with a given root server name can be searched. The name of the root servers to search were provided by the user in window 620 shown in FIG. 27. Third, the Xhost file name provided in window 640 can be searched for a given local server name. Window 660 allows the user to specify the order in which these searches should occur. Window 660 indicates search order parameters at 662 and requests a search order to resolve queries at 664. The user may select servers only at 666, servers before files at 668, files before servers at 670 and files only at 672. An update of the search order is performed by the user by clicking the icon at 674.

Figure 30:
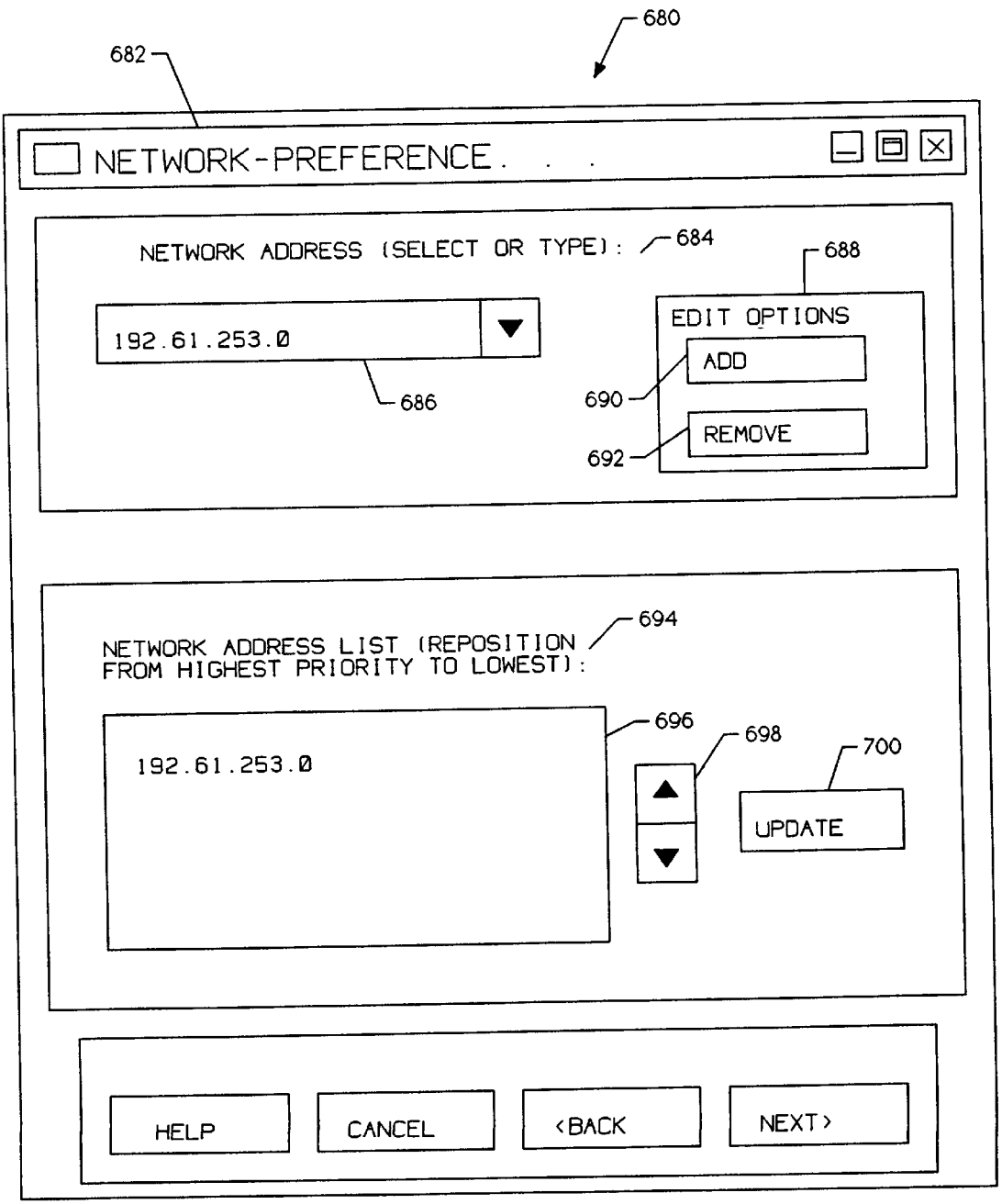
FIG. 30 is a view of a screen of the second embodiment requesting a network address and prioritization of a network address list.

FIG. 30 is a view of a screen of the second embodiment requesting a network address and prioritization of a network address list. Window 680 indicates network preference at 682 and requests a network address at 684. The user selects or types the network address at 686. Edit options are included at 688 which include adding a network address by clicking the icon at 690 or removing a network address by clicking the icon at 692. Window 680 requests the network address list repositioning from highest priority to lowest priority by entering network addresses at 696. The user can prioritize the network addresses by clicking the icon at 698 and can update the network address list priority by clicking the icon at 700.

Figure 31:
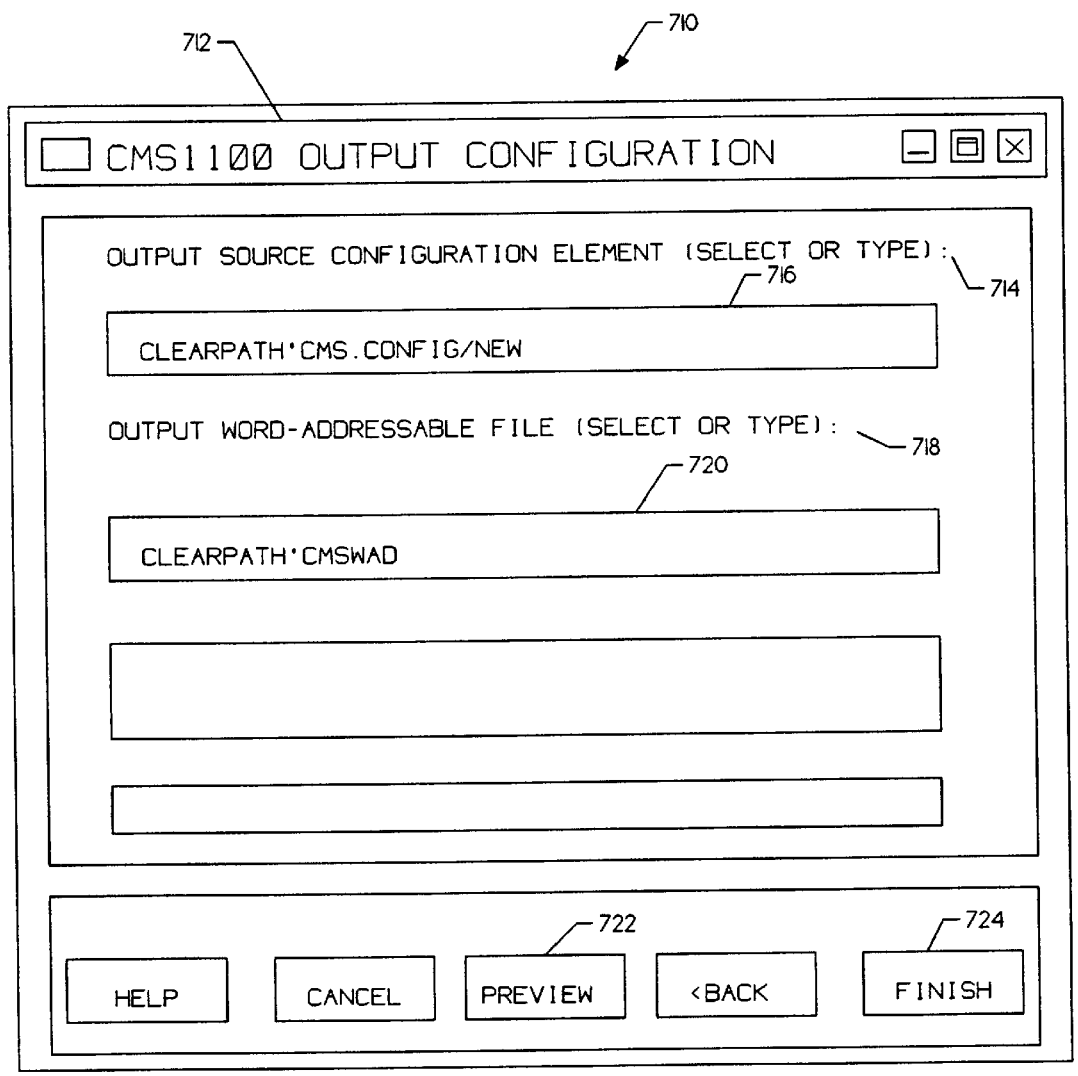
FIG. 31 is a view of a screen of the second embodiment previewing the configuration changes.

FIG. 31 is a view of a screen of the second embodiment requesting an output source configuration element and an output word addressable file. The window at 710 allows the user to specify the file name for the new configuration. The user can specify the name of the old configuration file, in which case the new configuration file will overwrite the file and the old file will be written to a backup file. The user can also create a new file, and in either instance the new configuration file data will be generated after the user selects the "finish" button by clicking on the icon at 724. Window 710 indicates CMS 1100 output configuration at 712 and requests an output source configuration element at 714. The user selects or types in a response at 716. Window 710 requests an output word addressable file at 718 and the user selects or types in the name at 720. Once the user clicks on the finish icon at 724, the new configuration file data will be generated. Before clicking on the finish icon on 724, the user may click on the preview icon at 722 to preview the changes before clicking on the finish icon at 724. Window 730 in FIG. 32 shows the preview of these changes.

Figure 32:
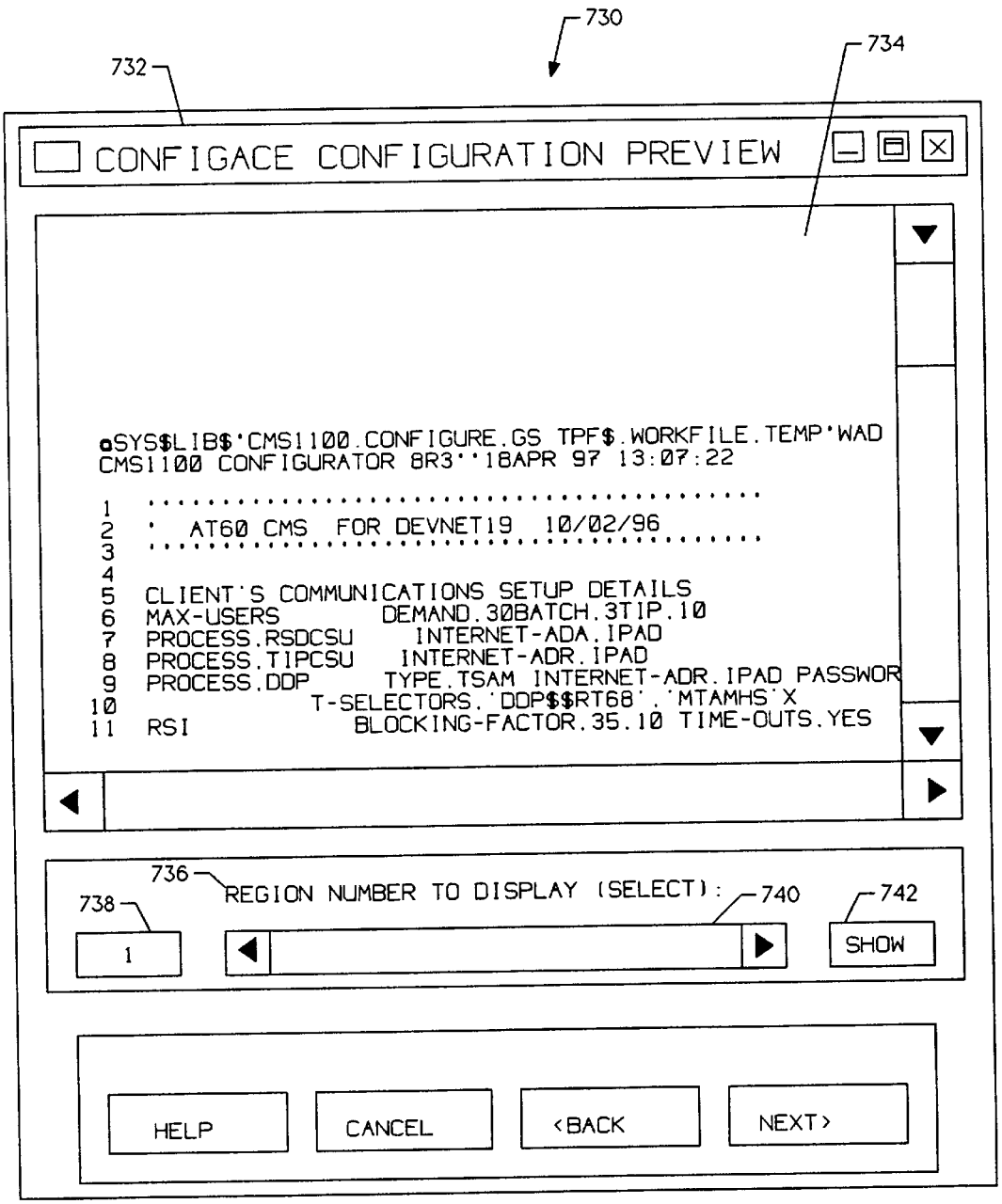
FIG. 32 is a view of a screen of the second embodiment allowing the configuration changes to be previewed before creating the new configuration.

FIG. 32 is a view of a screen of the second embodiment allowing the configuration changes to be previewed before creating the new configuration. Window 730 allows the user to preview the changes before selecting "finish" to actually create the new configuration file. The user clicks on the finish icon at 724 of window 710 in FIG. 31 to initiate the creating of the new configuration file. Window 730 indicates ConfigAce configuration preview at 732 and indicates the configuration at 734. Window 730 requests the region number to display at 736, where the region number is indicated at 738 and the user may select a region number at 740. The user may click on the icon on 742 to show the region number.

Having thus described the first embodiments of the present invention, those of skill in the art will readily appreciate that the teachings found herein may be applied to yet other embodiments within the scope of the claims hereto attached.

What is claimed is:

1. An apparatus comprising:
   a. a plurality of autonomous application programs resident in a data processing system wherein said data processing system includes a number of interconnected computer platforms, and wherein each of said plurality of application programs is resident on a different one of the number of computer platforms; and
   b. configuring means for automatically configuring said plurality of application programs so that each of said application programs can communicate with selected other ones of said plurality of application programs wherein said configuring means further comprises:
      a. user interface means for receiving user configuration information;
      b. application program interface means coupled to each of the plurality of application programs for receiving configuration requirements for each of the plurality of application programs; and
      c. configuration means coupled to said user interface means and to said application program interface means for determining a plurality of configuration settings, each of the plurality of configuration settings corresponding to one of the application programs, said configuration means writing each of said plurality of configuration settings to the corresponding computer platform so that the corresponding application program can read the configuration settings.

2. An apparatus according to claim 1 wherein each of the plurality of application programs is resident on a different one of the number of computer platforms.

3. An apparatus according to claim 2 wherein said number of computer platforms are heterogeneous.

4. An apparatus according to claim 2 wherein said configuration means comprises an application program.

5. An apparatus according to claim 4 wherein said application program runs on a user-dedicated computer platform, said user-dedicated computer platform providing said user interface means for receiving said user configuration information.

6. An apparatus according to claim 5 wherein said user interface means comprises a human interface to receive said user configuration information in human-understandable form.

7. An apparatus according to claim 5 wherein said user-dedicated computer platform comprises a workstation.

8. An apparatus according to claim 5 wherein said application program interface means is an industry-standard communications network.

9. An apparatus according to claim 8 wherein said industry-standard communications network comprises a local area network coupling each one of said plurality of computer platforms to said user-dedicated computer platform.

10. An apparatus according to claim 8 wherein said industry-standard communications network comprises a FDDI communications interface coupling each one of said plurality of computer platforms to said user-dedicated computer platform.

11. An apparatus according to claim 5 wherein said user configuration information comprises site specific information for each of the plurality of application programs.

12. An apparatus according to claim 5 wherein the configuration means further comprises:
   a. login means for logging into and accessing each of the number of computer platforms;
   b. application program access means for retrieving said plurality of application program configuration requirements from each of the number of computer platforms;
   c. application configuration determination means for determining each of said plurality of configuration settings for each of said plurality of application programs; and
   d. transfer means for transfer each of said plurality of configuration settings to the corresponding one of said number of computer platforms such that each of the application programs can read the corresponding configuration settings are be configured to communicate with selected other ones of said one of said plurality of application programs.

13. An apparatus according to claim 12 wherein said application configuration determination means stores each of said plurality of configuration settings into a corresponding one of a plurality of files on said user-dedicated computer platform.

14. An apparatus according to claim 13 wherein said transfer means transfers each of said plurality of files to said corresponding one of said plurality of computer platforms so that each of said plurality of files is accessible by said corresponding one of said plurality of application programs, said corresponding one of said plurality of application programs accessing said corresponding one of said plurality of files.

15. An apparatus according to claim 14 wherein said transfer means comprises a file transfer program, said file transfer program transferring each of said plurality of files to said corresponding one of said plurality of computer platforms.

16. An apparatus according to claim 15 wherein at least one of said plurality of computer platforms comprises a Unisys 2200 mainframe computer.

17. An apparatus according to claim 15 wherein at least one of said plurality of computer platforms comprises a UNIX-based workstation.

18. An apparatus according to claim 15 wherein each of said plurality of application programs comprise a program selected from the group consisting of a Unisys 2200 CMS communications program, an OPE 2200 UNIX emulation program, an open OLTP TM2200 communications program, and a Depcon print server.

19. An apparatus for configuring a distributed application program, said distributed application program including a plurality of distributed application portions, each of the distributed application portions being resident on a corresponding one of a plurality of computer platforms, comprising:

a. configuration means for automatically configuring the distributed application program so that each of the distributed application program portions can communicate with selected ones of the other distributed application program portions;

b. user interface means for receiving user configuration information;

c. application program interface means coupled to each of the plurality of distributed application program portions to receive a corresponding number of distributed application program portion configuration requirements; and d. said configuration means coupled to said user interface means and to said application program interface means for determining a plurality of configuration settings, one for each distributed application program portion, said configuration means writing said plurality of configuration settings to the appropriate computer platforms such that each of the distributed application program portions can read the corresponding configuration settings.

20. An apparatus according to claim 19 wherein said configuration means comprises an application program.

21. An apparatus according to claim 20 wherein said application program runs on a user-dedicated computer platform, said user-dedicated computer platform providing said user interface means coupled to a user interface to receive said user configuration information.

22. An apparatus according to claim 21 wherein said user interface comprises a human interface to receive said user configuration information in human-understandable form.

23. An apparatus according to claim 21 wherein said user-dedicated computer platform comprises a workstation.

24. An apparatus according to claim 21 wherein said application program interface means comprises an industry-standard communications network.

25. An apparatus according to claim 24 wherein said industry-standard communications network comprises a local area network coupling each one of said plurality of computer platforms to said user-dedicated computer platform.

26. An apparatus according to claim 24 wherein said industry-standard communications network comprises a FDDI communications interface coupling each of said plurality of computer platforms to said user-dedicated computer platform.

* * * * *